US008907915B2

(12) United States Patent
Li et al.

(10) Patent No.: US 8,907,915 B2
(45) Date of Patent: Dec. 9, 2014

(54) ELECTRONIC DEVICE AND METHOD FOR INSERTING IMAGES THEREOF

(71) Applicants: Xiao-Guang Li, Shenzhen (CN); Kuan-Hong Hsieh, New Taipei (TW); Yun Xiao, Shenzhen (CN); Shang-Hui Pi, Shenzhen (CN)

(72) Inventors: Xiao-Guang Li, Shenzhen (CN); Kuan-Hong Hsieh, New Taipei (TW); Yun Xiao, Shenzhen (CN); Shang-Hui Pi, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 115 days.

(21) Appl. No.: 13/730,840

(22) Filed: Dec. 29, 2012

(65) Prior Publication Data
US 2014/0002384 A1 Jan. 2, 2014

(30) Foreign Application Priority Data
Jun. 29, 2012 (CN) .......................... 2012 1 0223300

(51) Int. Cl.
| | | |
|---|---|---|
| G06F 3/041 | (2006.01) | |
| G06F 17/24 | (2006.01) | |
| G06F 3/0488 | (2013.01) | |
| G06F 3/03 | (2006.01) | |
| H04M 1/725 | (2006.01) | |
| G06K 9/22 | (2006.01) | |

(52) U.S. Cl.
CPC ............. *G06F 3/03* (2013.01); *H04M 1/72519* (2013.01); *G06F 17/242* (2013.01); *G06K 9/222* (2013.01); *G06F 3/04883* (2013.01); *G06F 2203/04807* (2013.01)
USPC ............. 345/173; 345/174; 345/156; 345/619

(58) Field of Classification Search
USPC .......... 345/173, 174, 156, 157, 619; 715/753; 348/333.01; 382/162; 600/437
See application file for complete search history.

(56) References Cited

U.S. PATENT DOCUMENTS

| 6,063,030 | A  * | 5/2000 | Vara et al. ...................... 600/437 |
|---|---|---|---|
| 2005/0135675 | A1 * | 6/2005 | Chen et al. ..................... 382/162 |
| 2009/0128518 | A1 * | 5/2009 | Kinoshita et al. ............. 345/174 |
| 2010/0214250 | A1 * | 8/2010 | Gillespie et al. .............. 345/173 |
| 2011/0126129 | A1 * | 5/2011 | Nagahara et al. ............. 715/753 |
| 2011/0134028 | A1 * | 6/2011 | Hiroshima et al. ........... 345/156 |
| 2011/0157225 | A1 | 6/2011 | Cheon et al. |
| 2011/0267291 | A1 * | 11/2011 | Choi et al. ..................... 345/173 |

(Continued)

FOREIGN PATENT DOCUMENTS

| CN | 101551720 A | 10/2009 |
|---|---|---|
| CN | 101986249 A | 3/2011 |

*Primary Examiner* — Thuy Pardo
(74) *Attorney, Agent, or Firm* — Novak Druce Connolly Bove + Quigg LLP

(57) ABSTRACT

A method for inserting images includes the following steps. Sense a touch trace of a user forming a closed loop having an enclosed region and generating a trigger signal if the touch trace forms a closed loop having an enclosed region. Sense handwritten touch input by the user within the enclosed region and generating signals associated with the user's handwritten touch input. Display the closed loop and the sensed handwritten touch input of the user. Determine whether the sensed handwritten touch input associates with an image inserting command in response to the trigger signal. Retrieve an image selected by the user from a storage unit, if the sensed handwritten touch input associates with an image inserting command. And display the selected image within the an enclosed region of the closed loop. An electronic device using the method is also provided.

19 Claims, 34 Drawing Sheets

(56) References Cited

U.S. PATENT DOCUMENTS

| | | | |
|---|---|---|---|
| 2012/0019462 A1* | 1/2012 | Kim et al. | 345/173 |
| 2012/0119987 A1* | 5/2012 | Im et al. | 345/156 |
| 2012/0176372 A1* | 7/2012 | Kim et al. | 345/419 |
| 2013/0002576 A1* | 1/2013 | Kim et al. | 345/173 |
| 2013/0155099 A1* | 6/2013 | Ha et al. | 345/619 |
| 2013/0286269 A1* | 10/2013 | Wood et al. | 348/333.01 |
| 2014/0022166 A1* | 1/2014 | Ahn et al. | 345/157 |

* cited by examiner

| Touch Input / Gesture | Command |
|---|---|
| memo / term meaning memo | Display the interface for inputting memos |
| draw a slash ╱ on the upper left corner of the displayed page/display unit | Delete the content of the current page |
| ╱ on the upper right corner of the box | Display a predetermined menu bar |
| Written arithmetic formulas, such as $+$  $-$  $\times$  $\div$ | Run the written arithmetic formula to calculate the result |
| ... | ... |
| www / www | Display the web browser interface for inputting websites |
| G / g | Display the website of Google corporation on the web browser interface |
| B / b | Display the website of Baidu corporation on the web browser interface |
| S / s | Display the website of Sohu corporation on the web browser interface |
| U /u / slide rightward | Flip to the previous page |
| D /d/ slide leftward | Flip to the next page |
| Y /y/ ✓ | Execute positive operations such as entering/opening/confirmation |
| Q /q/ × | Execute negative operations such as denial/exit/shutting down |
| ... | ... |
| [photo] , [insert photo] , [insert image] | Insert the selected image in the box |
| Circle content of a displayed electronic file / Circle content of a displayed electronic file and write the term "print" or other terms having the same meaning with the term "print" on the circled content | Print the circled content into an electronic file having a predetermined format, or send the circled content to a printer to print the circled content on a paper/papers |
| Circle content of a displayed electronic file and select a contact number / Circle content of a displayed electronic file and write the term "fax" or other terms having the same meaning with the term "fax" on the circled content | Transmit the circled content to the selected contact number, or send the circled content to an electrograph to fax the circled content to the selected contact number |
| arrow ↗ | Execute the function corresponding to the menu pointed by the arrow |
| ... | ... |

FIG. 2

| 04. 2012 | | | | | | |
|---|---|---|---|---|---|---|
| Sunday | Monday | Tuesday | Wednesday | Thursday | Friday | Saturday |
| 1<br>April Fools'<br>Day | 2 | 3 | 4<br>Tomb-<br>sweeping<br>Day | 5 | 6 | 7 |
| 8 | 9 | 10 | 11 | 12 | 13 | 14 |
| 15 | 16 | 17 | 18 | 19 | 20 | 21 |
| 22 | *Grandpa's* 23 | *Birthday* 24 | 25 | 26 | *Complement work day* 27 | 28 |
| 29 | 30 | 1 | 2 | 3 | 4 | 5 |

301                 (a)                 301

| 04. 2012 | | | | | | |
|---|---|---|---|---|---|---|
| Sunday | Monday | Tuesday | Wednesday | Thursday | Friday | Saturday |
| 1<br>April Fools'<br>Day | 2 | 3 | 4<br>Tomb-<br>sweeping<br>Day | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 1 | 2 | 3 | 4 | 5 |

ELECTRONIC DEVICE AND METHOD FOR INSERTING IMAGES THEREOF

BACKGROUND

1. Technical Field

The present disclosure relates to an electronic device and a method for inserting images thereof.

2. Description of Related Art

Many electronic devices provide a function for users to insert images. The user moves the cursor displayed on the electronic device to a position where the user wants to insert an image, and then selects the item for inserting images from a displayed menu to insert a selected image. The user can also select an image before selecting the item for inserting images. Then the electronic device displays the selected image at the position the cursor stops. However, it is inconvenient for the user because the user needs to first select a menu, then select a menu item, as well as selecting an image. Additionally, if the image is not the right size and orientation for the selected insertion point, then the user must go through many more steps and perhaps open other programs to modify the image.

Therefore, what is needed is an electronic device and a method for inserting images thereof to alleviate the limitations described above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding sections throughout the several views.

FIG. 2 is a schematic diagram showing a table stored in the storage unit of the electronic device of FIG. 1.

FIG. 17 is a schematic view showing the operation interface displayed on an electronic device in accordance with an exemplary embodiment.

DETAILED DESCRIPTION

Figure 1:
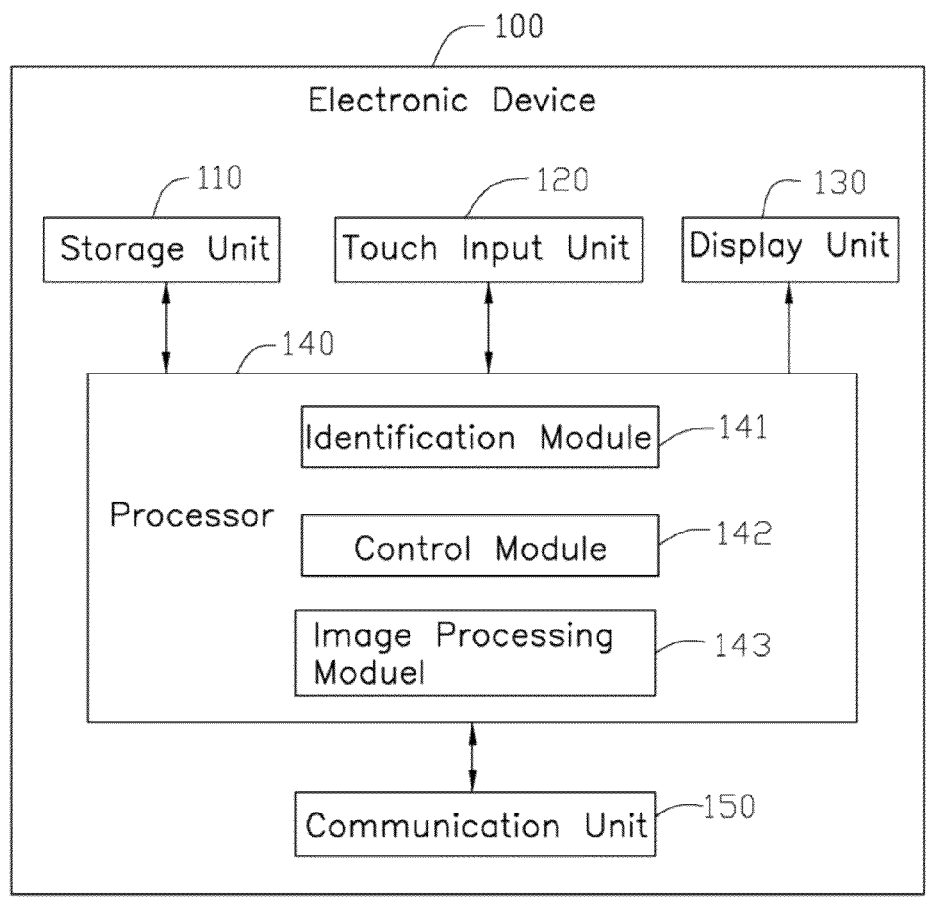
FIG. 1 is a block diagram of an electronic device in accordance with an exemplary embodiment.

FIG. 1 is a block diagram of an exemplary embodiment of an electronic device 100. The electronic device 100 has a touch input function for receiving handwriting input and intelligently executing the function associated with the command corresponding to the handwriting input. The electronic device 100 is a super notebook having a touch input unit 120 and a handwriting input function. The super notebook is a commercial super intelligent device, and has a shape similar to conventional tablet computers. In alternative embodiments, the electronic device 100 can be other commercial or personal electronic devices having touch input units and handwriting input functions, such as a mobile phone, a personal digital assistant, an electronic reader, a tablet computer, or a digital photo frame, for example.

The user can add notes, comments, and signatures to electronic files via handwriting input on the electronic device 100. The electronic device 100 automatically extracts a signature feature file reflecting the features of the handwriting signature of the user, packages the electronic file added with notes, comments, and signatures to a package file, and encrypts the package file with the extracted signature feature file. The electronic device 100 also transmits the encrypted package file to a recipient via Internet.

Furthermore, the electronic device 100 executes functions automatically that are associated with simple touch input by the user. For example, if "www." is written on the touch input unit 120, the electronic device 100 automatically activates the web explorer and displays a web browser interface with commonly used websites and/or recently viewed websites. If a box is drawn on the touch input unit 120, and the term "photo" is written in the drawn box, the electronic device 100 displays the drawn box, and then displays a window to show a folder including image files such as photo files and/or picture files adjacent the drawn box. The user can then select an image file on the touch input unit 120. In another embodiment, if the user slides a finger/pointing device from an image in a displayed folder into the drawn box, or draws an arrow from an image in a displayed folder into the drawn box, the electronic device 100 then automatically displays the image within the drawn box. The electronic device 100 also can automatically adjust the size of the image to match the size of the drawn box. The electronic device 100 further provides functions for intelligently adding memos, intelligent calculation, printing or faxing circled or selected portions of an electronic file, etc. The details are as follow.

1. Operation Interfaces for the User

Referring to FIG. 1, in this exemplary embodiment, the electronic device 100 includes a storage unit 110, a touch input unit 120, a display unit 130, and a processor 140.

The storage unit 110 is able to store electronic files. The electronic files can be received or downloaded by the electronic device 100 via a wired or wireless manner. The electronic files can also consist of files created and edited by users on the touch input unit 10. Referring to FIG. 2, the storage unit 110 also stores a relationship table 112 recording a mapping relationship between touch inputs and a number of commands associated with the touch inputs. The touch input is selected from the group consisting of: a character, a term, a phrase, a sentence, a symbol, a numeral, a gesture, and a sign etc. It is to be understood, the relationship table 112 only shows a few possibilities of touch input and associated commands, the mapping relationship can be varied according to need. In an alternative embodiment, the electronic device 100 further offers the user to add and define the mapping relationship between the touch input and associated commands.

The touch input unit 120 senses touch input of handwritten content by a user and generating signals associated with the user's touch input. The touch input unit 120 also transmits the generated signals to the processor 140.

The display unit 130 is a liquid crystal display (LCD). In another embodiment, the display unit 130 is an electronic paper display. The touch input unit 120 can be overlaid on the display unit 130 to form a touch screen. The touch input unit 120 can be the same size or smaller than the display unit 130.

The processor 140 includes an identification module 141, a control module 142, and an image processing module 143. The image processing module 143 receives handwriting input commands/content and creates images of the handwriting input commands/content according to the signals generated by the touch input unit 120. The control module 142 controls displaying the created images on the display unit 130 and stores the created images in real time in the storage unit 110. In the embodiments, the displayed images also can be handwritten content sensed by the touch input unit 120. The identification module 141 recognizes the touch input of the handwritten content and identifies if the touch input of the recognized handwritten content is associated with a command according to the generated signals and the relationship table 112. The control module 142 further controls the electronic device 100 to execute the associated command identified by the identification module 141.

The electronic device 100 further includes a communication unit 150 for communicating and transmitting data with other electronic devices via wired or wireless manner.

Figure 3:
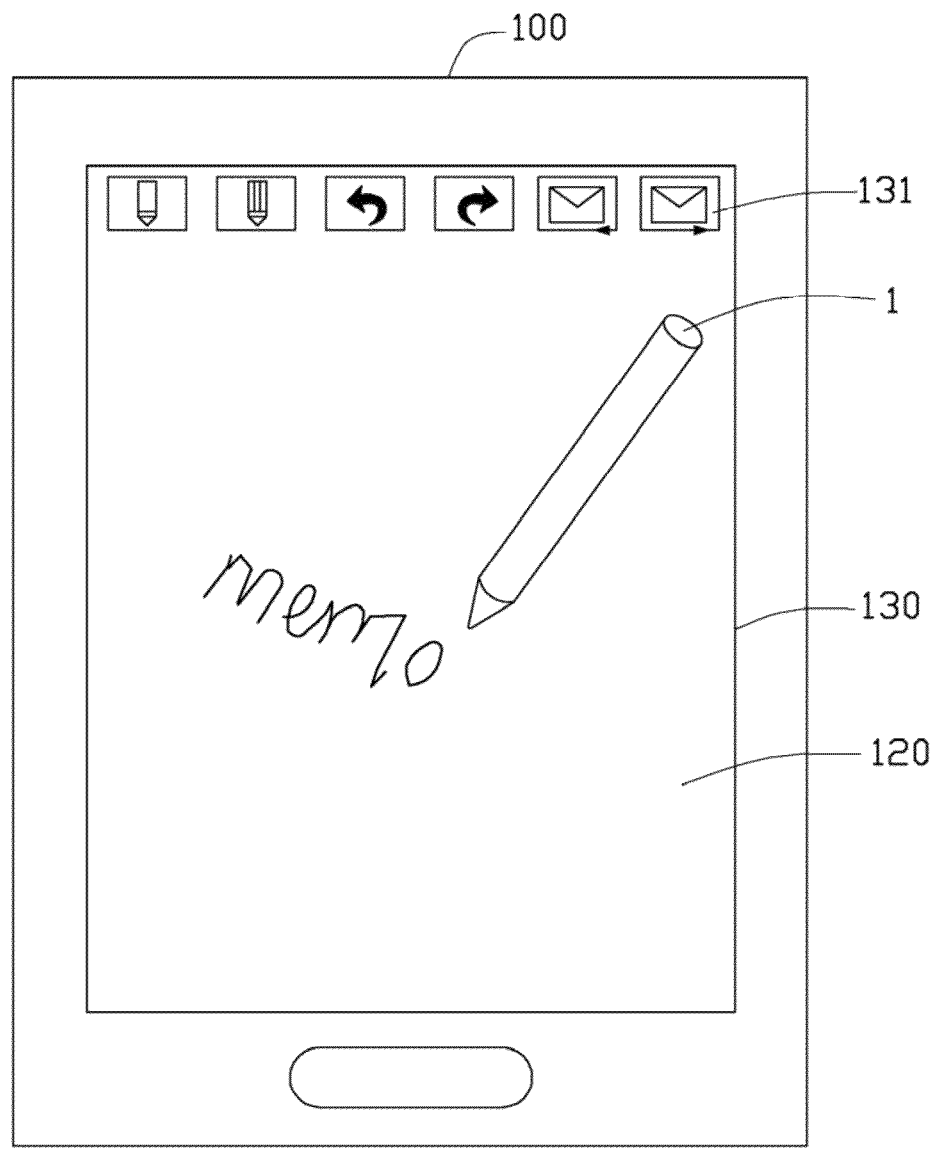
FIGS. 3-10 are schematic diagrams showing the operation interfaces displayed on the electronic device of FIG. 1.

Referring to FIG. 3, in an embodiment, the touch input unit 120 is a transparent touch panel overlaid on the display unit 130 of the electronic device 100 to form a touch screen. The input unit 120 is the same size as the display unit 130. That is, all regions of the display unit 130 can receive handwriting input of the user. The top of the display unit 130 displays a number of icons 131 for a user to select. The icons 131 include icons representing a stylus, e-mail, back button, etc. The display unit 130 displays the touch input in response to handwriting input of the stylus 1 or a finger of the user on the touch input unit 120. The identification module 141 further compares the touch input of the user and the touch input recorded in the relationship table 112, to find the corresponding touch input and the associated command in the relationship table 112. The control module 142 then controls the corresponding function modules to execute the command and controls the display unit 130 to display the interface showing the executing process and result of the command.

Figure 4:
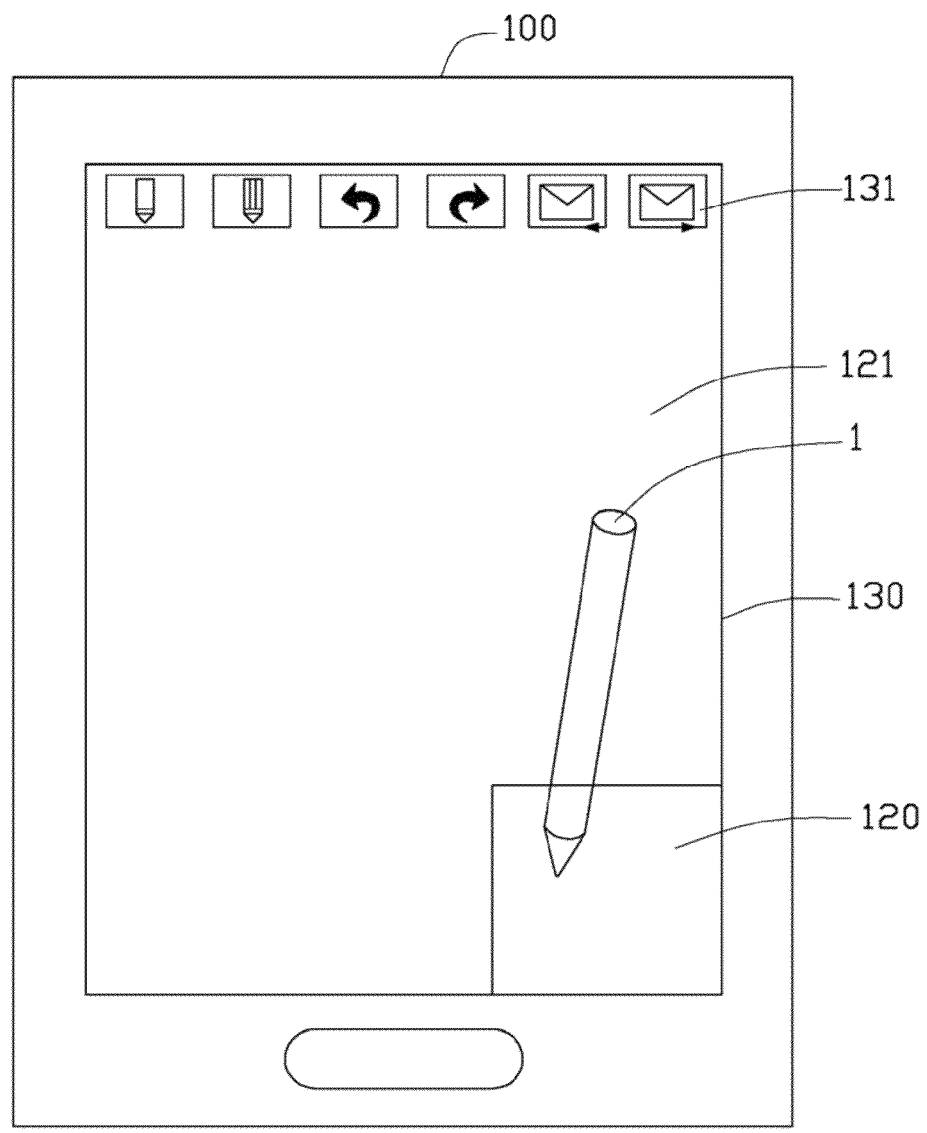

FIG. 4 shows another embodiment. The differences between this embodiment and the embodiment shown in FIG. 3 are: in this embodiment, the touch input unit 120 of the electronic device 100 is positioned at a special region on the display unit 130. The display unit 130 is a touch screen including a command input region 120 and a content input region 121. The command input region 120 is positioned at the lower right corner of the display unit 130, for receiving handwriting input commands of the user, and converting the handwriting input commands to electrical signals. The other regions of the display unit 130, i.e., the content input region 121 cannot be used for touch input of commands. That is, the content input region 121 cannot receive and identify any handwriting input commands of the user. In the embodiment, the size of command input region 120 is smaller than the size of the display unit 120—the touch screen.

Figure 5:
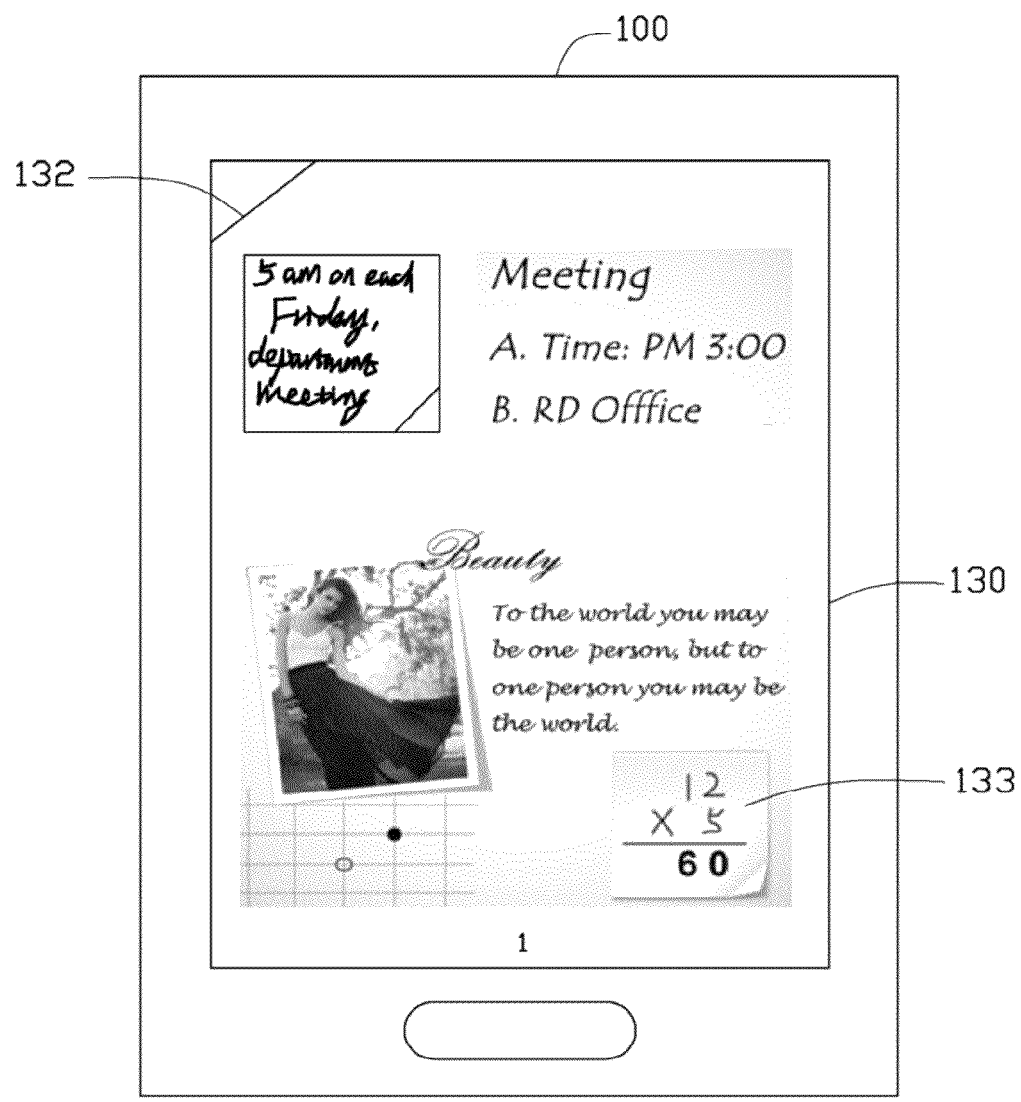

When the user writes the command "memo" on the touch input unit 120 shown in FIG. 3 or FIG. 4, the identification module 141 retrieves the associated command "display the interface for inputting memos" from the relationship table 112. The control module 142 controls the display unit 130 to display the interface for inputting memos, then, the user can write memos on the displayed interface. As shown in FIG. 5, the written memos of the user are recorded. If the user wants to delete the written memos, he/she just needs to draw a slash 132 on the upper left corner of the displayed page/display unit 130. The identification module 141 then retrieves the command "delete the content of the current page" associated with the drawn slash 132. The control module 142 then controls the display unit 130 to display a blank interface for inputting touch input.

When the user writes an arithmetic equation 133 (shown in FIG. 5) on the touch input unit 120 shown in FIG. 3 or FIG. 4, for example, 12 multiplied by 5 and a horizontal line under the multiplication sign and the written number 5, the identification module 142 retrieves the associated command "run the written arithmetic equation to calculate the result." The control module 142 then runs the arithmetic equation 133 and calculates a result—60, and controls the display unit 130 to display the calculated result—60 under the written horizontal line of the arithmetic equation 133. Thus, the electronic device 100 provides user friendly interfaces and functions which match and satisfy the handwriting habits of users when they use real paper. The details are described in the eighth part of this specification—Intelligently Identifying Handwritten Arithmetic Equations and Intelligently Calculating the Results.

When the user writes "www" or "www." on the touch input unit 120 shown in FIG. 3 or FIG. 4, the display unit 130 displays the web browser interface for inputting whole or partial website addresses or names of websites. For example, if the user writes "G" or "g" on the touch input unit 120, the display unit 130 may then display the Google search page on the web browser interface.

When the electronic device 100 displays the interface shown in FIG. 3 or FIG. 4, if the user writes "U" or "u" (the first letter of the word "Up") or inputs a sliding touch rightward on the touch input unit 120, the display unit 130 displays the previous page. If the user writes "D" or "d" (the first letter of the word "Down") or slides leftward on the touch input unit 120, the display unit 130 displays the next page of the currently displayed page. If the user writes "Q" or "q" (the first letter of the word "Quit") or "x" on the touch input unit 120, the electronic device 100 executes a negative operation such as exiting the running application, shutting down the electronic device 100, or other similar operation. If the user writes "Y" or "y" (the first letter of the word "Yes") or "√" on the touch input unit 120, the electronic device 100 executes a positive operation such as entering/opening an application or file.

Figure 6:
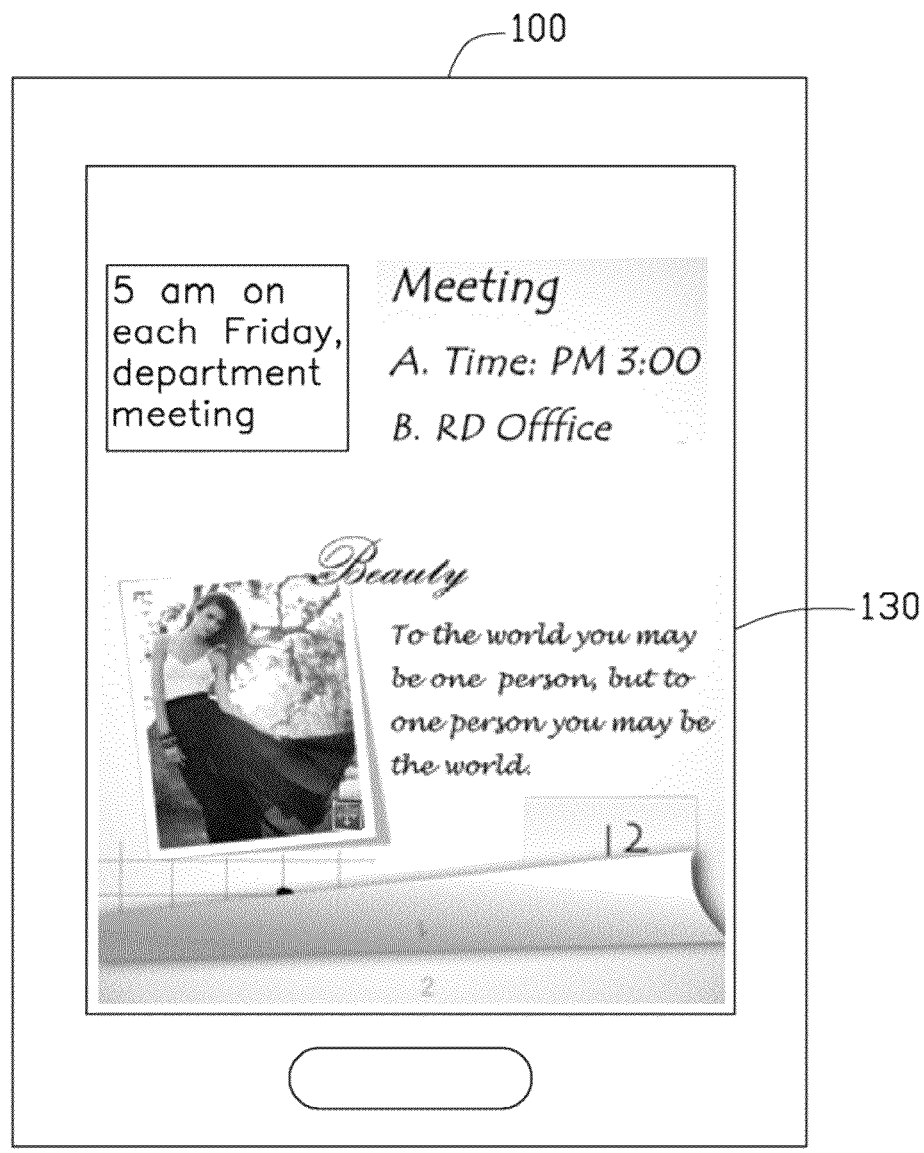

When the display unit 130 displays the interface as shown in FIG. 5, if the stylus or the finger of the user slides from the bottom of the display unit 130 to the top of the display unit 130, the control module 142 controls the display unit 130 to display the vivid effect page shown in FIG. 6 for indicating page flipping. After the page flipping process, the display unit 130 displays the next interface for inputting memos, the control module 142 further stores the previous page including the written memos in the storage unit 110. Then the user can continue to write memos in the next interface.

Figure 7:
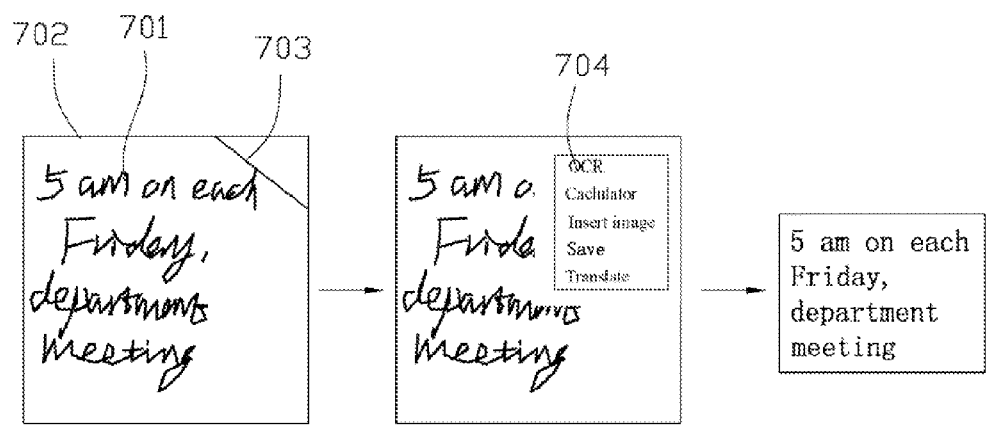

Referring to FIG. 7(*a*), if the user draws a box 702 enclosing written content such as the written content 701, and draws a slash 703 on the upper right corner of the box 702, the identification module 141 identifies the command of the user and retrieves an associated command "display a predetermined menu bar." Referring to FIG. 7(*b*), the control module 141 controls the display unit 130 to display the predetermined menu bar 704. In this embodiment, the menu bar 704 includes the following items selectable by the user: optical character recognition (OCR), calculator, insert image, save, and translate. It is to be understood, the items included in the menu bar 704 can be varied according to need. If OCR is selected, the image processing module 143 identifies the written content 701 enclosed by the box 702, and converts the written content 701 to printed content using a predetermined font. The predetermined font can be a default font such as times new roman or some other font predefined by the user. The control module 142 controls the display unit 130 to display the converted written content (see FIG. 7(*c*)). As such, the electronic device 100 is able to conveniently process the boxed written content according to the user's touch input.

Figure 8:
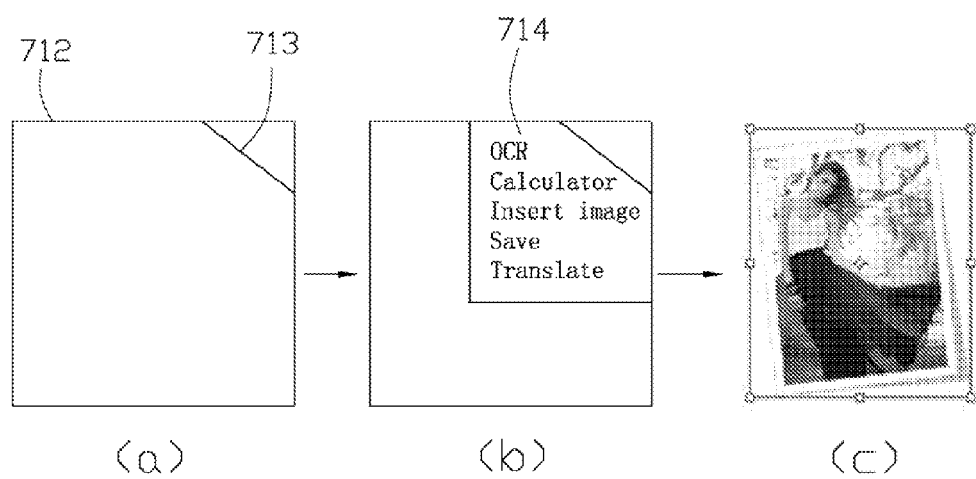

Referring to FIG. 8(*a*), if the user draws a box 812 and then draws a slash 713 on the upper right corner of the drawn box 812, the identification module 141 identifies the touch input of the user and retrieves associated command "display a predetermined menu bar." Referring to FIG. 8(*b*), the control module 142 controls the display unit 130 to display the predetermined menu bar 714. If the insert image item is selected, the control module 142 then controls the display unit 130 to display the image selected by the user in the box 812, which is shown in FIG. 8(*c*).

Figure 9:
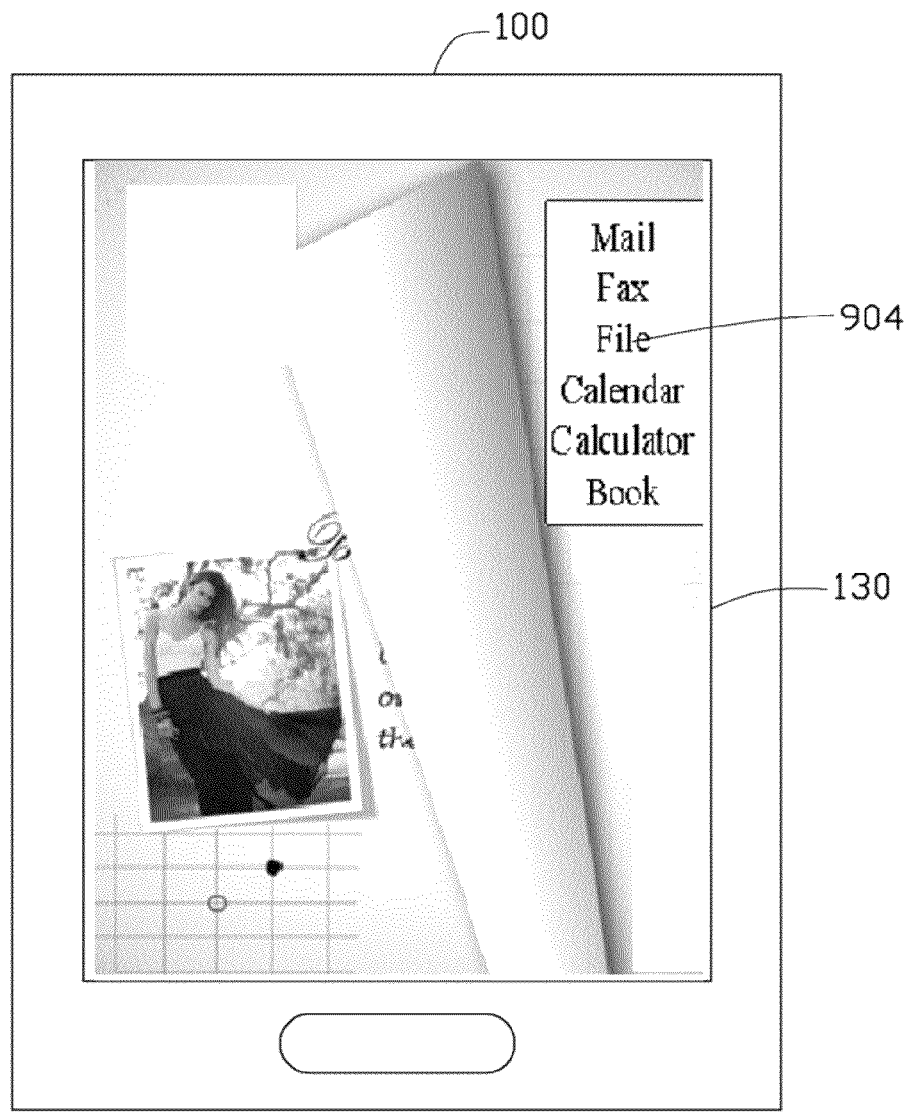
Figure 10:
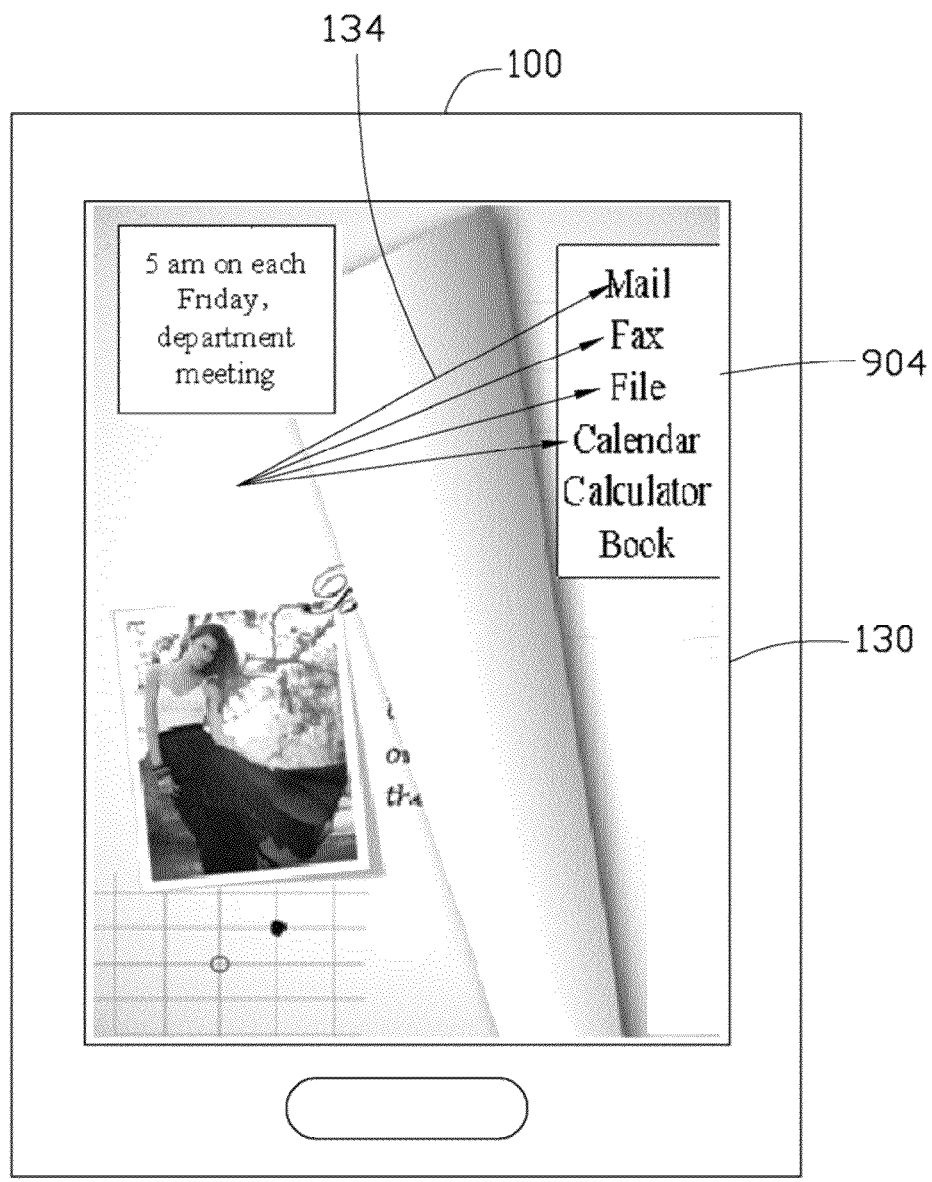

In an exemplary embodiment, when the stylus or the finger of the user slides leftward from the right of the display unit 130, the control module 142 controls the display unit 130 to display a page as shown in FIG. 9. A menu bar 904 is displayed on the right of the displayed page. In this embodiment, the menu bar 904 includes the following user selectable items: e-mail, fax, file, calendar, calculator, and book. It is to be understood, the items included in the menu bar 904 can be varied according to need. If the user draws an arrow 134 from the displayed page to one of the items included in the menu bar 904 (see FIG. 10), the control module 142 then controls adding the content of the displayed page to an editable page associated with the item pointed to by the drawn arrow. For example, the content of the displayed page can be added to an e-mail, to to-be-faxed content, to the current date or a designated date of the calendar, etc.

In another exemplary embodiment, if the user draws a slash on the upper right corner of the displayed page on the touch input unit 120, the identification module 141 identifies the touch input and retrieves the associated command "display a predetermined menu bar" from the relationship table 112. The control module 142 also controls the display unit 130 to display a predetermined menu bar. If one of the items included in the menu bar is selected by the user, the control module 142 controls the corresponding function modules of the electronic device 100 to execute the function associated with the selected item, and controls the display unit 130 to display the corresponding interface/page.

2. Inserting Image(s)

In an exemplary embodiment, if the user wants to insert an image during the handwriting input process, the user just draws a pattern having an enclosed region at the position where the image is to be located and draws an arrow from outside of the pattern to the inside, or writes the term/phrase "photo," or "insert photo," or uses some other predetermined touch input associated with the command—"insert a photo/photos," for example. Then the electronic device adjusts the size of the selected image to fit inside the pattern and displays the selected image in the enclosed region of the pattern. In this embodiment, the pattern having an enclosed region can be a box, a circle, an ellipse, a triangle, a square, or other patterns having an irregular or a regular shape and having a enclosed region. The predetermined touch input associated with the command—"insert a photo/photos" can be a term, a phrase, or other touch input having the same meaning as "insert a photo/photos." The selected image can be an image pre-selected by the user or an image selected at that time by the user from a folder that pops up after the command—"insert a photo/photos" is received.

In an alternative embodiment, if the drawn pattern is inclined, the electronic device further rotates the selected image to match the drawn pattern.

Figure 11:
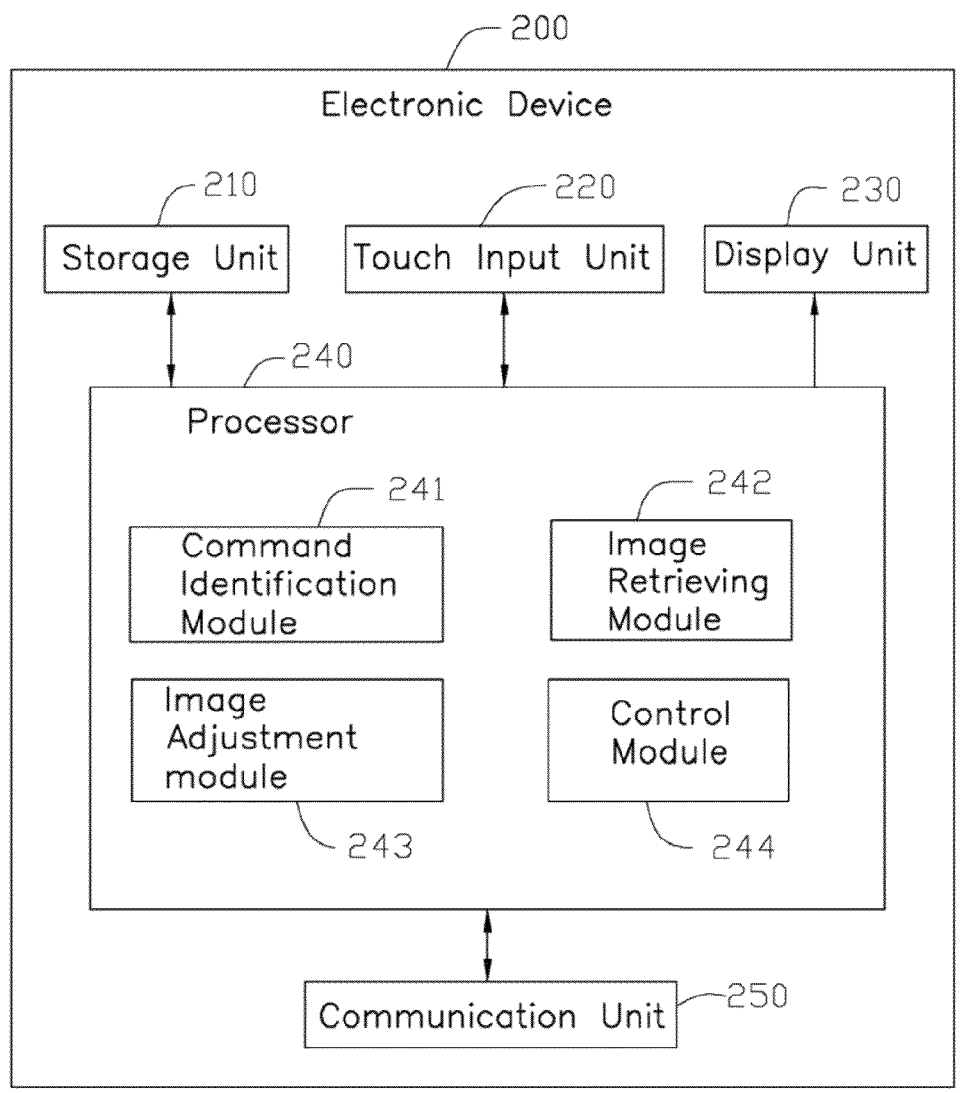
FIG. 11 is a block diagram of an electronic device in accordance with an exemplary embodiment.
Figure 12:
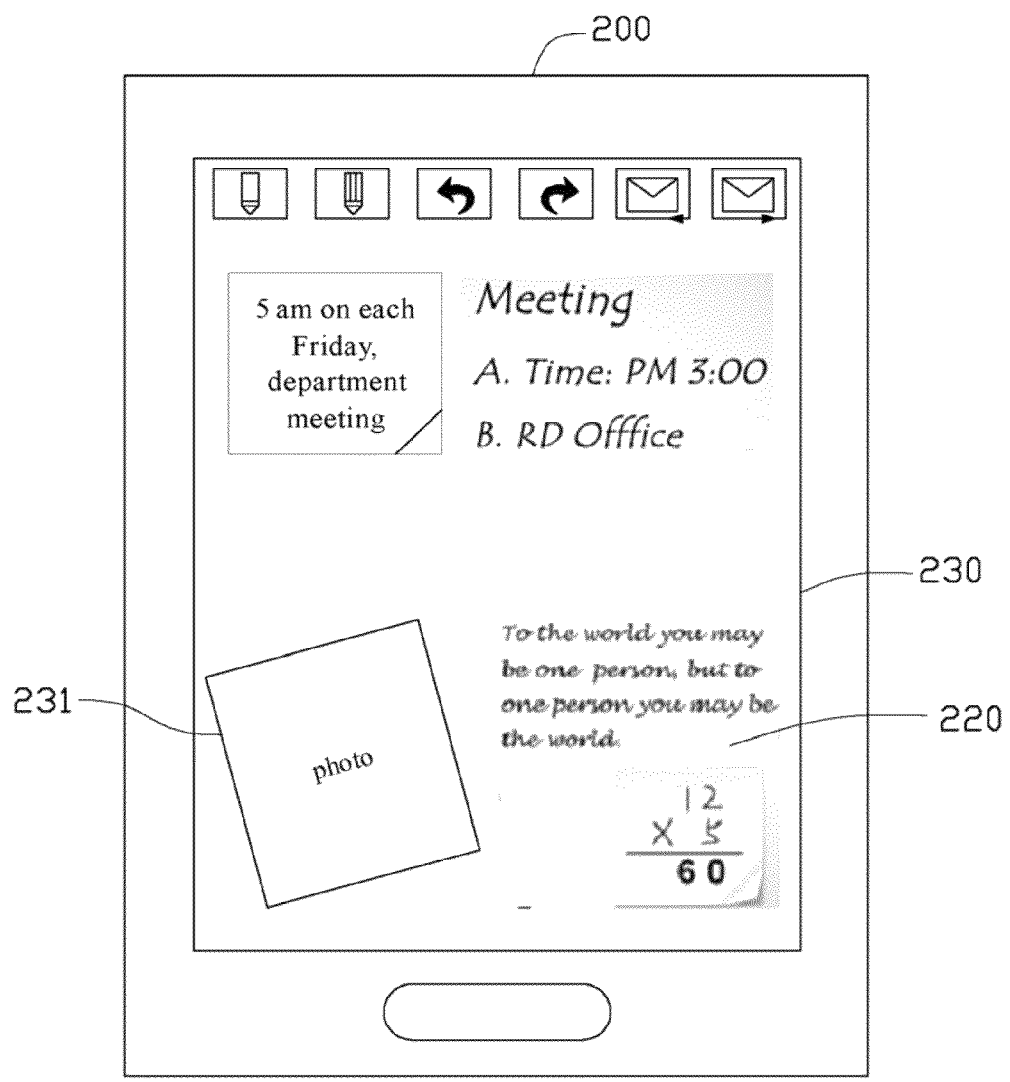
FIGS. 12-13 are schematic diagrams showing the operation interfaces displayed on the electronic device of FIG. 11.

Referring to FIGS. 11 and 12, in the embodiment, the electronic device 200 includes a storage unit 210, a touch input unit 220, a display unit 230, and a processor 240. The storage unit 210 stores a number of images selected from the group consisting of pictures, and photos etc. The storage unit 210 also stores a relationship table recording a mapping relationship between handwritten touch inputs and a number of commands associated with the handwritten touch inputs. The touch input unit 220 generates signals in response to user's handwritten input. In the embodiment, the touch input unit 220 generates a trigger signal if a touch trace of a user on an electronic file displayed on the display unit 230 forming a closed loop having an enclosed region, senses handwritten touch input by the user within the enclosed region and generates signals associated with the handwritten touch input. The processor 240 includes a command identification module 241, an image retrieving module 242, and a control module 244. The command identification module 241 determines a command associated with the sensed handwritten touch input according to the relationship table 112 in response to the trigger signal from the touch input unit 220. The control module 244 controls the display unit 230 to display the content written by the user. In the embodiment, the touch input of the user on the touch input unit 220 can be gestures such as an image inserting gesture for inserting images.

Referring to FIG. 12, when the input of the user is drawing a box 231 and writing a term "image," "photo," "picture," or other terms, letters, or phrases having a meaning or representative of "image" or "inserting an image or images," or the user draws an arrow from outside the box 231 to the inside of the box 231, the command identification module 241 identifies the touch input of the user is an image inserting command. The image retrieving module 242 then retrieves an image selected by the user from the storage unit 210. The control module 244 controls the display unit 230 to display the selected image in the box 231. The selected image can be a preselected image by the user. If the user has not previously selected an image to-be-inserted, the image retrieving module 242 further retrieves the storage path of images stored in the storage unit 210 when the command identification module 241 determines the touch input of the user is the image inserting command. The control module 244 further controls the display unit 230 to display the retrieved storage path and associated file/folder for the user to select an image, and then displays the image selected by the user in the box 231.

The processor 240 further includes an image adjustment module 243 for comparing the size of the selected image and the size of the box 231 to determine whether the sizes are the same, if yes, the control module 244 controls the display unit 230 to display the selected image in the box 231, otherwise, the image adjustment module 243 further adjusts the size (includes the length and the width) of the selected image to be the same size as the box 231. And then the control module 244 controls the display unit 230 to display the size adjusted selected image in the box 231.

Figure 13:
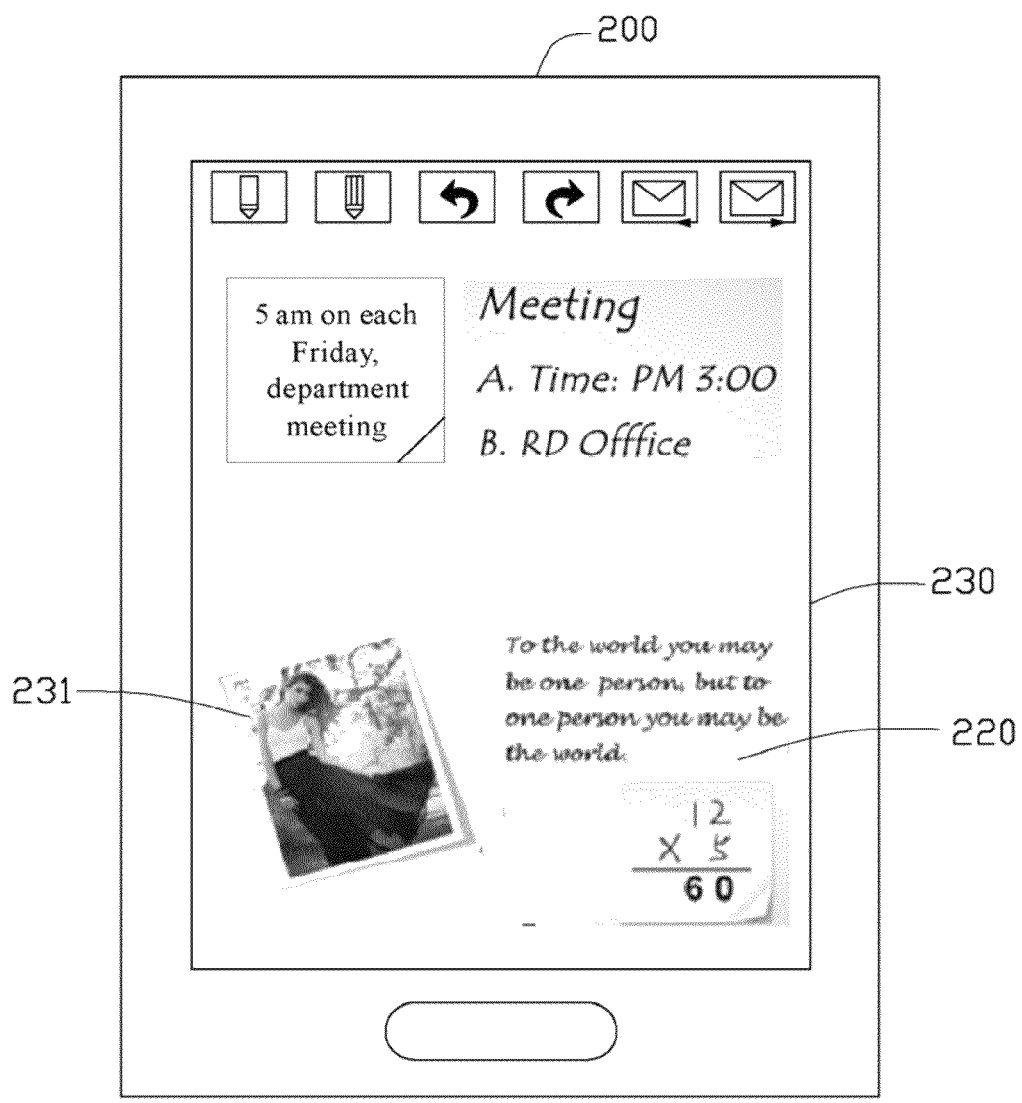

The image adjustment module 243 further determines whether the box 231 has an angle relative to the horizontal line, and rotates the selected image to the same degree as the angle of the box 231, thus the selected image match will have the same orientation as the box 231 (see FIG. 13). In an alternative embodiment, the electronic device 200 further pops up a dialog box to prompt the user to confirm whether he/she wants to insert an image/images when the command identification module 241 determines the touch input of the user is an image inserting command. The electronic device 200 then inserts a pre-selected image or provides image choices and inserts a selected image according to the user's input.

It is to be understood, although the present disclosure has been specifically described on the basis of the embodiment of the box 231 drawn by the user, the disclosure is not to be construed as being limited to the box 231. Various changes or modifications may be made to the embodiment without departing from the scope and spirit of the disclosure. The image adjustment module 243 adjusts the size and orientation of the selected image to match the drawn pattern having an enclosed region.

The electronic device 200 also can include a communication unit 20 for communicating with other electronic devices. The electronic device 200 can receive and send images such as photos via the communication unit 20.

Figure 14:
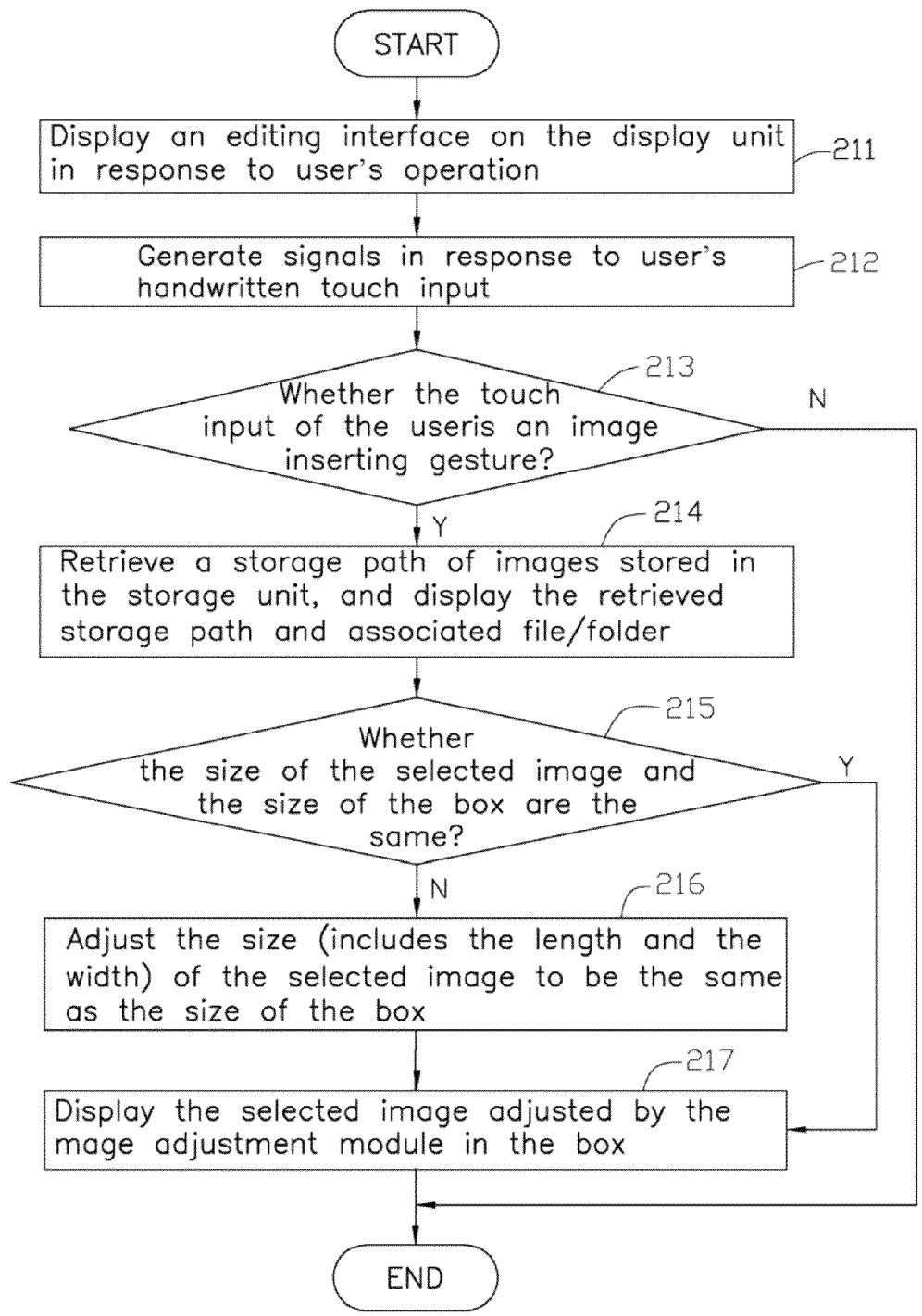
FIG. 14 is a flowchart of an image inserting method for electronic devices, such as the one of FIG. 11, in accordance with the exemplary embodiment.

FIG. 14 shows a flowchart of an image inserting method of the electronic device 200 of FIG. 11. The electronic device 200 includes a storage unit, a touch input unit, a display unit, and a processor. The method includes the following steps, each of which is related to the various components contained in the electronic device 200:

In step S211, display an editing interface on the display unit 230 in response to user's operation.

In step S212, the touch input unit 220 generates signals in response to user's touch input.

In step S213, the command identification module 241 identifies whether the touch input of the user is an image inserting command according to the generated signals, if yes, the process goes to step S214, otherwise, the process ends. In the embodiment, if the touch input of the user is drawing a pattern having an enclosed region and drawing an arrow from outside the pattern to the inside, or writes the term/phrase "photo," "insert photo," or a predetermined touch input associated with the command—"insert a photo/photos," the command identification module 241 identifies and determines the touch input of the user is an image inserting command. In the embodiment, the pattern drawn by the user is a box 231.

In step S214, the image retrieving module 242 retrieves a storage path of images stored in the storage unit 210, and the control module 244 controls the display unit 230 to display the retrieved storage path and associated file/folder.

In step S215, the image adjustment module 243 compares the size of the selected image and the size of the box 231 to determine whether the sizes are the same, if no, the process goes to step S216, otherwise, the process goes to step S217.

In step S216, the image adjustment module 243 adjusts the size (includes the length and the width) of the selected image to be the same as the size of the box 231.

In step S217, the control module 244 controls the display unit 230 to display the selected image adjusted by the image adjustment module 243 in the box 231.

With such a configuration, the user can insert an image by using the electronic device 200 and the image inserting method thereof. The user also can control the inserting size and the inserting position of the image to-be-inserted by controlling the size and the position of the pattern such as the box 231, which is convenient for users.

3. Automatically Adding Memos

In an exemplary embodiment, the electronic device can automatically identifies the written content and determines whether the user wants to add memos according to the written content. The written content of the user includes the memo and the memo date. The electronic device also can add the memo of the written content to the corresponding memo date on a calendar.

Figure 15:
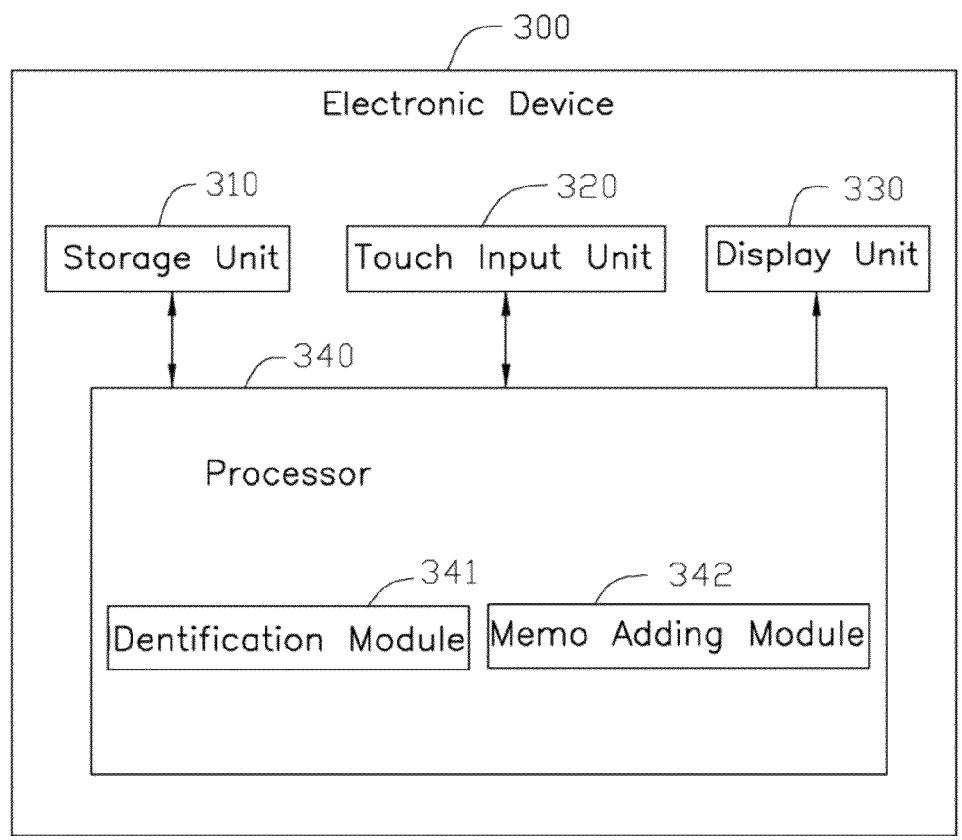
FIG. 15 is a block diagram of an electronic device in accordance with an exemplary embodiment.

Referring to FIG. 15, the electronic device 300 includes a storage unit 310, a touch input unit 320, a display unit 330, and a processor 340. The storage unit 310 stores a calendar and a predetermined date format used for automatically adding memos. The storage unit 310 is also used for storing memos written by users. The touch input unit 320 senses touch input of written content on the displayed calendar by the user, generates signals associated with the user's touch input, and recognizes the written content of the user according to the generated signals. The processor 340 includes an identification module 341 and a memo adding module 342. The identification module 341 identifies whether the touch input of the user indicates a memo adding command. The identification module 341 also identifies whether the touch input of the user contains a memo adding command. The calendar is an electronic calendar.

In this embodiment, the touch input can be gestures for writing memos. The identification module 341 determines the touch input of the user indicating a memo adding command if the generated touch input includes a memo date which matches the predetermined date format stored in the storage unit 310. The predetermined date format is selected from the group consisting of: "year-month-day," "day-month-year,"

"month-day-year," "year/month/day," "month/day/year," "day/month/year," "year.month.day," and "month. day, year" etc. Year for the four-digit Arabic numerals such as "2012" can be shortened to double-digit Arabic numerals such as "12." Month can be numerals between 1-12, and Date can be numerals between 1-31. In another embodiment, the predetermined date format can omit the year, in this situation, the electronic device 100 consider the current year as the default year.

When the identification module 341 determines the touch input of the user indicating a memo adding command, the memo adding module 342 automatically adds the memo of the written content and the memo date to a memo file storing memos written by the user. Presuming the predetermined date format is "year-month-day," the written content input by the user is "2011-9-14 Lily's birthday," the identification module 341 identifies the written content including a date—"2011-9-14" matching the predetermined date format—"year-month-day," and therefore determines the touch input of the user is a memo adding command. The memo adding module 342 then adds the memo—"Lily's birthday" relative to the date—"September 14, 2011" on the calendar to the memo file stored in the storage unit 310. That is, the memo is added to the memo file associated with the date—September 14, 2011.

In an alternative embodiment, the identification module 341 further controls the display unit 330 to display a dialog box to prompt the user to confirm whether user wants to add memos, when it is determined the touch input of the user indicates a memo adding command. The memo adding module 342 then adds memos or gives up to add memos for the user according to the user's selection. The memo adding module 342 further sets the reminder manner such as the alarm for reminding the user of the memo on the memo date. The reminder manner is preset by the user or a default manner of the electronic device 300.

Figure 16:
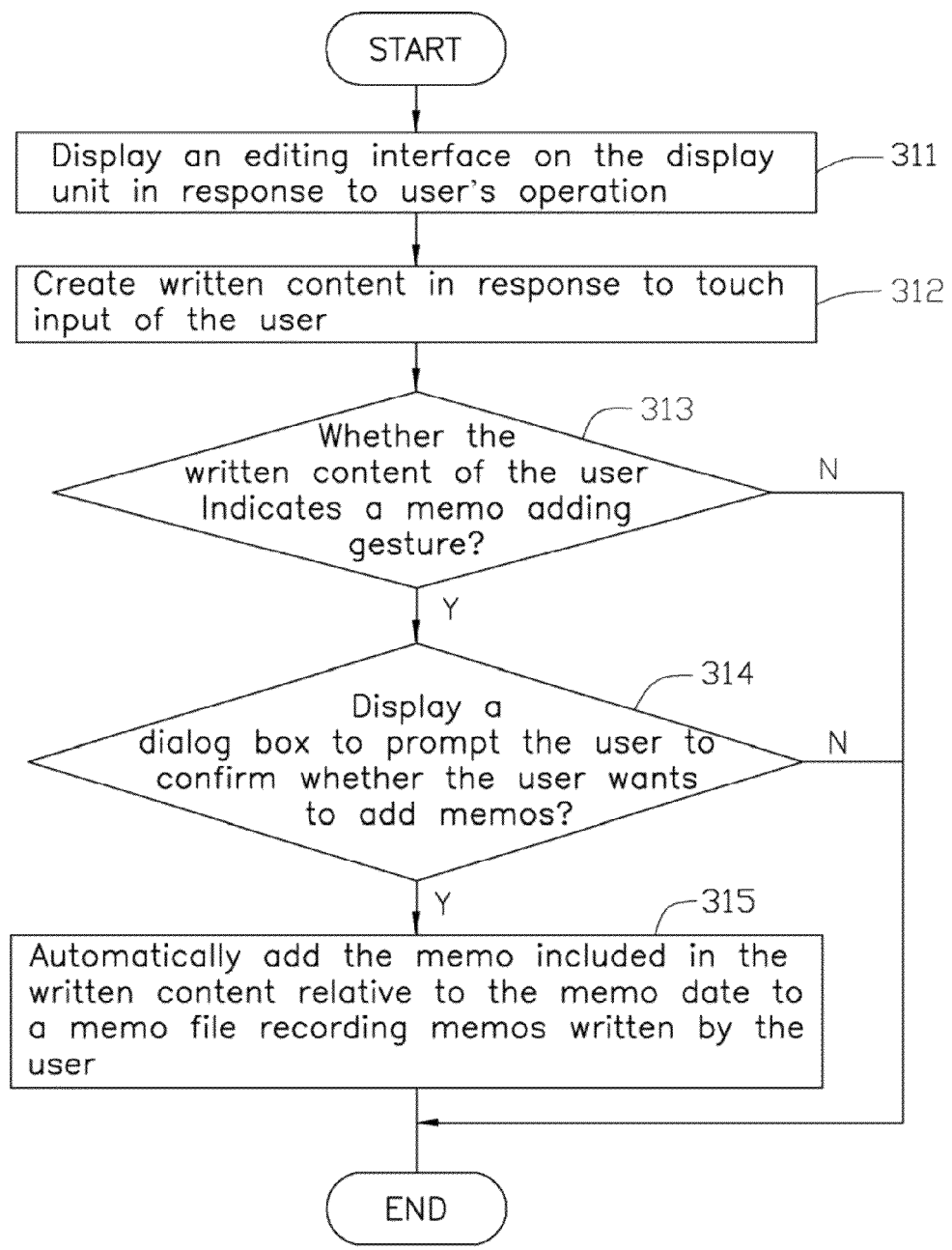
FIG. 16 is a flowchart of a method for adding memos for electronic devices, such as the one of FIG. 15, in accordance with the exemplary embodiment.

FIG. 16 shows a flowchart of a memo adding method of the electronic device 300 of FIG. 15, in accordance with an exemplary embodiment. The electronic device 300 includes a storage unit, a touch input unit, a display unit, and a processor. The storage unit stores a calendar and a predetermined date format. The method includes the following steps, each of which is related to the various components contained in the electronic device 300:

In step S311, the electronic device 300 display an editing interface on the display unit 330 in response to user's operation.

In step S312, the touch input unit 320 creates written content in response to touch input of the user. In the embodiment, the touch input unit 320 senses touch input of written content thereon by the user, generates signals associated with the user's touch input, and recognizes the written content of the user according to the generated signals.

In step S313, the identification module 341 identifies whether the written content of the user indicates a memo adding command, if yes, the process goes to step S314, otherwise, the process ends.

In step S314, the identification module 341 further controls the display unit 330 to display a dialog box to prompt the user to confirm whether the user wants to add memos, if yes, the process goes to step S315, otherwise, the process ends.

In step S315, the memo adding module 342 automatically adds the memo included in the written content relative to the memo date to a memo file recording memos written by the user.

With such a configuration, the user can conveniently add memos to a date without finding or selecting the date in the calendar. Instead, the user only needs to write the memo and a memo date using the predetermined date format on the editing interface, the electronic device 300 then automatically adds the memo to the memo file of the memo date.

In another exemplary embodiment, the electronic device 300 displays a calendar interface in response to user's input, if the user touch inputs a memo on a date of the displayed calendar interface, the electronic device 300 will automatically associate that memo with the date. In the embodiment, the touch input unit 320 generates signals for retrieving the calendar in response to the user's operation associated with a command to open the calendar. The processor 340 retrieves the calendar stored in the storage unit 310 and displays a calendar interface of the retrieved calendar on the display unit 330. The display unit 330 and the touch input unit 320 together form a touch screen. The calendar interface displayed on the display unit 330 is shown in FIG. 17(a). The calendar interface is similar to a page of the classic paper desktop calendar or the interface of a conventional electronic calendar. That is, the calendar interface includes numbered squares representing days organized by weeks forming a grid. Each date associated with a square and each number representing the date is displayed in a corresponding square. If the user writes on a square displayed on the display unit 330, the touch input unit 320 generates input signals and creates the corresponding written content 301, and controls the display unit 330 to display the written content 301 on the calendar interface. The written content 301 is displayed at the position of the touch input on the display unit 330.

The identification module 341 determines the square corresponding to the written content 301 and the memo date of the written content 301 associated with the square according to the input signals from the touch input unit 320. In the embodiment, the identification module 341 determines the memo date of the written content 301 according to the coordinates of the first touch point of the written content 301. That is, wherever the user first touches the input unit 320 when starting to write the memo determines which date the memo will be associated with. For example, if the coordinates of the first touch point of the written content 301 are within one of the squares labeled with a date displayed on the display unit 330, the identification module 341 then determines the date associated with the square is the memo date. In an alternative embodiment, the identification module 341 determines the memo date of the written content 301 according to which square has the most content.

The memo adding module 342 then automatically adds the written content 301 to the memo file in the storage unit 310 of the determined memo date. The memo adding module 342 also creates a memo mark of the memo date and controls the display unit 330 to display the created memo mark on the memo date. The memo mark can be, for example, a shaded triangle displayed in the upper right corner of the memo date. The memo mark also can be the square associated with the memo date being shaded (see FIG. 17(b)). It is to be understood, the marking manner, shape, and color of the memo mark can be varied according to need. The touch input can be gestures for writing memos.

Referring to FIG. 17(a), when the user touch inputs the written content 301—"Grandpa's birthday" on the square associated with the date—Apr. 23, 2012, the memo adding module 342 will automatically add the written content 301—"Grandpa's birthday" to the memo file of the date—Apr. 23, 2012. The memo adding module 342 also shades the square associated with the date—Apr. 23, 2012 with gray as the memo mark for reminding the user (see FIG. 17(b)). If the user handwriting inputs the written content 301—"complement work day" on the square associated with the date—Apr.

28, 2012, the memo adding module 342 will automatically add the written content 301—"complement work day" to the memo of the date—Apr. 28, 2012, and adds a triangle infilled with gray on the upper right corner of the square associated with the date—Apr. 28, 2012 as the memo mark for reminding the user (see FIG. 17(b)).

Figure 18:
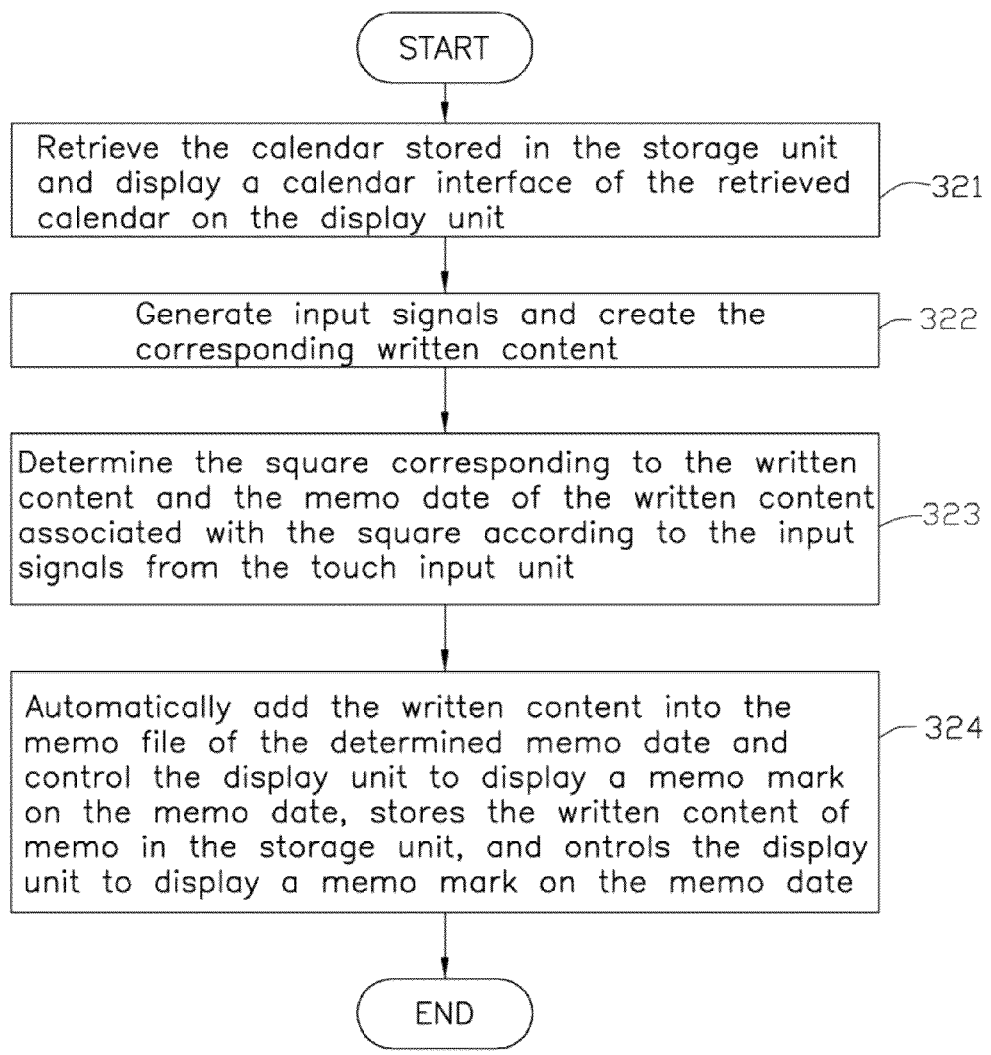
FIG. 18 is a flowchart of a method for adding memos for electronic devices, such as the one of FIG. 17, in accordance with the exemplary embodiment.

FIG. 18 shows another flowchart of a memo adding method of the electronic device 300 of FIG. 15, in accordance with another exemplary embodiment. The electronic device 300 includes a storage unit, a touch input unit, a display unit, and a processor. The storage unit stores a calendar. The method includes the following steps, each of which is related to the various components contained in the electronic device 300:

In step S321, the processor 340 retrieves the calendar stored in the storage unit 310 and displays a calendar interface of the retrieved calendar on the display unit 330. In the embodiment, the calendar interface is similar to a page of the classic paper desktop calendar or the interface of conventional electronic calendar. Each date associated with a square and each number representing the date is displayed in a corresponding square.

In step S322, the touch input unit 320 generates input signals and creates the corresponding written content 301.

In step S323, the identification module 341 determines the square corresponding to the written content 301 and the memo date of the written content 301 associated with the square according to the input signals from the touch input unit 320. The identification module 341 determines the memo date of the written content 301 according to the coordinates of the first touch point of the written content 301. For example, if the coordinates of the first touch point of the written content 301 are within one of the squares labeled with a date displayed on the display unit 330, the identification module 341 then determines the date associated with the square is the memo date. In an alternative embodiment, the identification module 341 determines the memo date of the written content 301 according to which square has the most content.

In step S324, the memo adding module 342 automatically adds the written content 301 to the memo file of the determined memo date and controls the display unit 330 to display a memo mark on the memo date, stores the written content of memo in the storage unit 310, and controls the display unit 330 to display a memo mark on the memo date.

With such a configuration, when the user wants to add memo on a date in the calendar, he/she just needs to write the memo on a square displayed on the calendar interface and associated with the memo date, then the electronic device 300 will automatically add the written memo to the memo of the memo date and stores the memo the memo date.

4. Printing and Faxing the Circled Portions of an Electronic Page/File

An exemplary embodiment of this disclosure provides a new manner for printing and faxing files. When an electronic file such as a page is displayed on the electronic device, the user can circle one or more portions of the page to be printed or faxed, and input a printing command or a fax command on the circled portion(s), then the electronic device will print the content of the circled portion(s) in a predetermined format or send the content of the circled portion(s) to a printer to print the content on paper, or fax the content of the circled portion(s) to a selected fax number or send the content of the circled portion(s) to a fax machine to fax the content of the circled portion(s) to the selected fax number. That is, the electronic device provides a manner for printing or faxing part of the content of the displayed electronic page.

Figure 19:
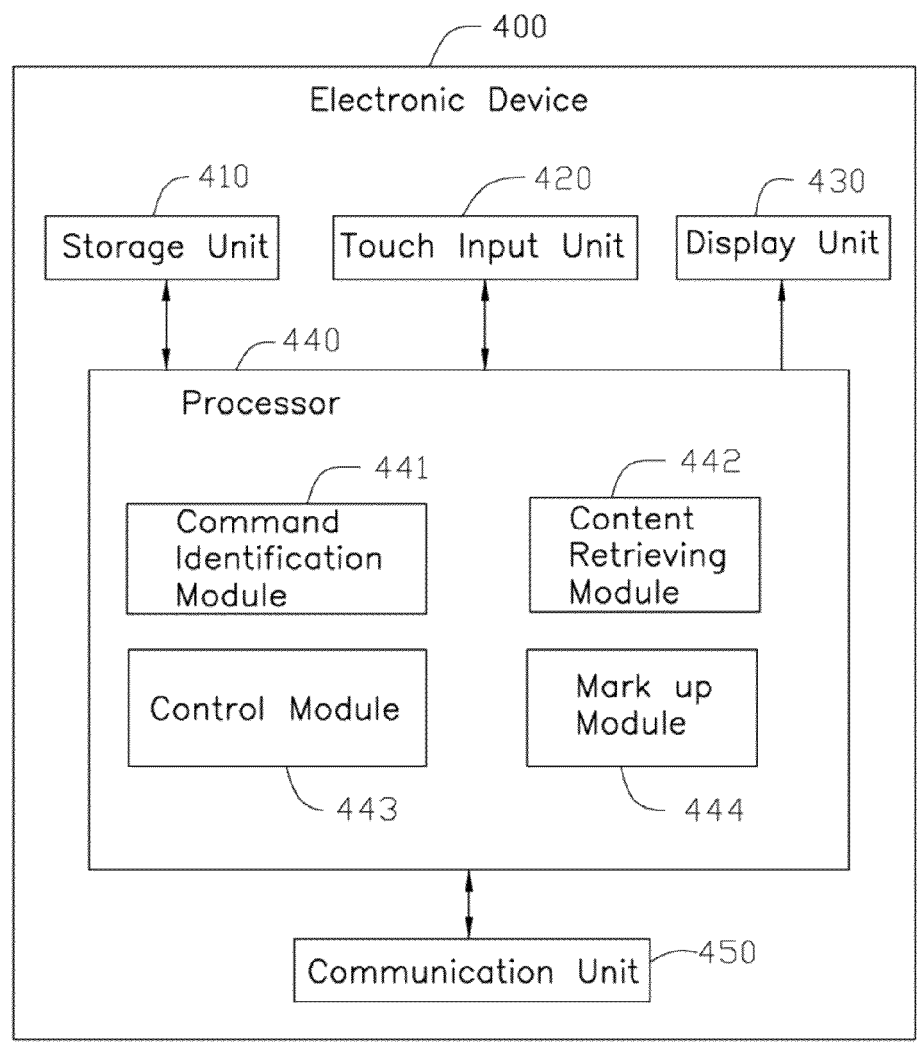
FIG. 19 is a block diagram of an electronic device in accordance with an exemplary embodiment.

Referring to FIG. 19, the electronic device 400 includes a storage unit 410, a touch input unit 420, a display unit 430, a processor 440, and a communication unit 450. The storage unit 410 stores a relationship table 112 and a fax number of electronic files. The touch input unit 420 generates signals in response to user's handwriting input. The communication unit 450 is configured for transmitting data such as the content to-be-faxed to other electronic devices. In the embodiment, the electronic device 400 is connected to a printer and/or a fax machine. The relationship table 112 records a mapping relationship between touch gestures and a plurality of commands associated with the touch gestures.

The processor 440 includes a command identification module 441, a content retrieving module 442, and a control module 443. The control module 443 is configured for controlling the display unit 430 to display an electronic device according to the signals generated in response to user input. The command identification module 441 is configured for determining whether the command of the user is a printing or fax command according to the signals input on the electronic file and the relationship table 112. When the command identification module 441 determines the command of the user is a printing or fax command, the content retrieving module 442 retrieves the circled content 432 of the electronic file 431 circled by the user. The circled content 432 is the content circled within the circle drawn on the electronic file 431. If the command of the user is a printing command, the control module 443 sends the circled content 432 to the printer to print the circled content 432. If the command of the user is a fax command, the control module 443 automatically faxes the circled content 432 to a fax number selected by the user, or transmits the circled content 432 to the fax machine to fax the circled content 432 to the fax number selected by the user.

Figure 20:
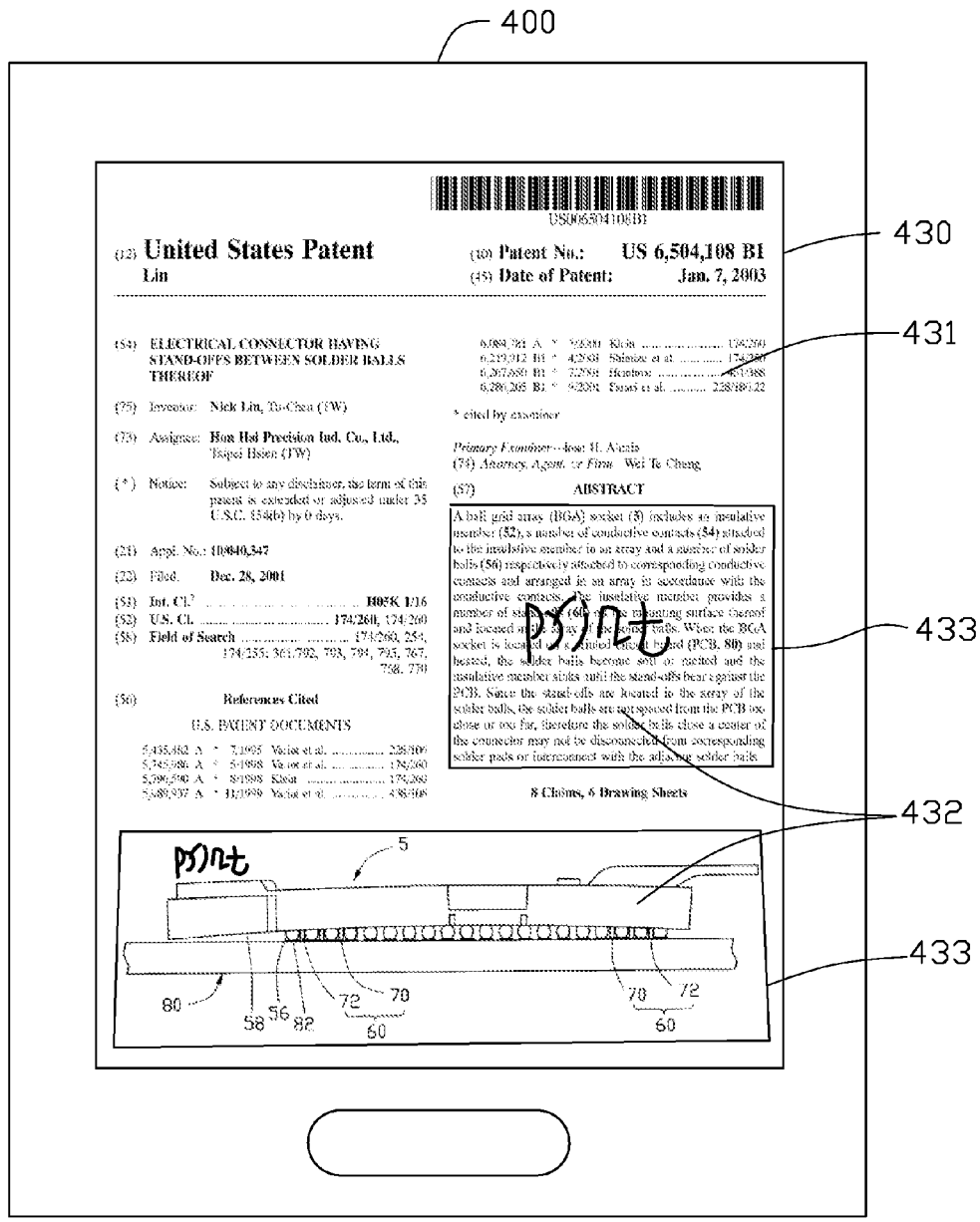
FIG. 20 is a schematic view showing the operation interface displayed on the electronic device of FIG. 19 in accordance with the exemplary embodiment.

In the embodiment, the touch input of the user on the touch input unit 420 can be touch gestures, such as a printing gesture, a fax gesture etc. The user circles content of the electronic file 431 displayed on the display unit 430 through the touch input unit 420 can be the printing command. The user circles content of the electronic file 431 displayed on the display unit 430, and writes the term "print" or some other term predefined to mean print on the circled content on the touch input unit 420 can be the printing command. The user circles content of the electronic file 431 displayed on the display unit 430, and selects or preselects a fax number on the touch input unit 420 can be the fax command. Referring to FIG. 20, two portions—the two circled contents 432 of the displayed electronic file 431 are circled.

In an alternative embodiment, rather than sending content to a printer a virtual printer or fax machine may receive the circled content as follows. The processor 440 further includes a format conversion module 444 and an image processing module 446. The image processing module 446 is configured to recognize a circled path 433 as input by the user. The format conversion module 444 is configured for converting the format of the circled content 432 to a predetermined electronic format of an electronic file. In the embodiment, the predetermined electronic format is the hyperlink text markup language (HTML) format. In another embodiment, the predetermined electronic format can also be .tif format or .jpg etc. Thus, the electronic device 400 provides a paperless printing manner for the user. When the command of the user is a fax command, the control module 443 is further configured for controlling the communication unit 450 to transmit the converted electronic file having the predetermined electronic format (eg. HTML format) to a fax number or an e-mail address selected by the user. Thus the electronic device 400 faxes the circled content 432 to the fax number or the e-mail address.

In an embodiment, the processor 440 also includes a mark up module 444. The mark up module 444 is configured for adding comments to the content in response to user's input. For example, when the user inputs comments on the display unit 430, the mark up module 444 then creates the marked up content corresponding to the input comments by the user. The control module 443 then controls the displays unit 430 to display the marked up content created by the mark up module 444. When the retrieved circled content retrieved by the content retrieving module 442 includes the marked up content, the control module 443 also converts the format of the retrieved circled content including the marked up content to an electronic file having the HTML format, and transmits the converted electronic file having the HTML format to a fax number or an e-mail.

Figure 21:
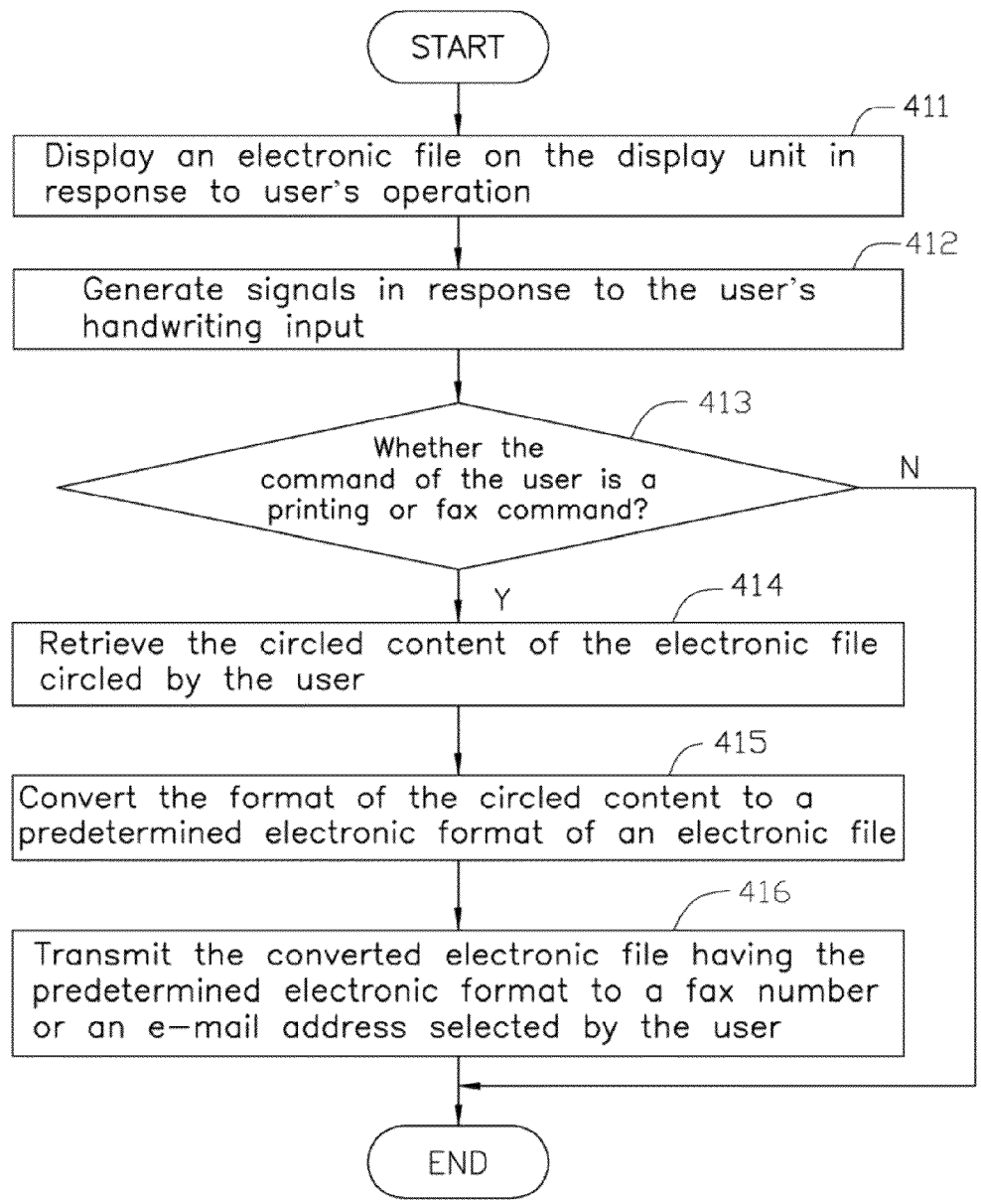
FIG. 21 is a flowchart of a method for print and fax circled portions for electronic devices, such as the one of FIG. 19, in accordance with the exemplary embodiment.

FIG. 21 shows a flowchart of a method for printing or faxing circled content of the electronic device 400 of FIG. 19. The electronic device 400 includes a storage unit storing electronic files, a touch input unit, a display unit, and a processor. The touch screen generates signals in response to the user touches. The method includes the following steps, each of which is related to the various components contained in the electronic device 400:

In step S411, the electronic device 400 displays an electronic file on the display unit 430 in response to user's operation.

In step S412, the touch input unit 420 generates signals in response to the user's handwriting input. In the embodiment, the user can circle content of the displayed electronic file, and can mark up comments on the displayed electronic file on the touch input unit 420.

In step S413, the command identification module 441 determines whether the command of the user is a printing or fax command according to the signals input on the electronic file and the relationship table 112. If yes, the process goes to step S414, otherwise, the process ends. In the embodiment, the user circling content of the electronic file 431 displayed on the display unit 430 on the touch input unit 420 can be the printing command. In another embodiment, the user circles content of the electronic file 431 displayed on the display unit 430, and writes the term "print" or some other term predefined to mean print on the circled content on the touch input unit 420 can be the printing command. The user circles content of the electronic file 431 displayed on the display unit 430, and selects or preselects a fax number on the touch input unit 420 can be the fax command.

In step S414, the content retrieving module 442 retrieves the circled content 432 of the electronic file 431 circled by the user.

In step S415, the control module 443 converts the format of the circled content 432 to a predetermined electronic format of an electronic file. In the embodiment, the predetermined electronic format is the HTML format.

In step S416, the control module 443 controls the communication unit 450 to transmit the converted electronic file having the predetermined electronic format (HTML) to a fax number or an e-mail address selected by the user.

With such a configuration, the user can select parts of the displayed electronic file to print or fax using the electronic device 400. That is, the user can circle content of the displayed page on the electronic device 400, and then electronic device 400 prints the circled content by the user to a HTML electronic file or faxes the circled content by the user to a selected number or an e-mail selected by the user. Compared to the conventional printing or fax manner, the user does not need to print or fax all content of the displayed page, which saves energy and papers and brings the convenient operation for the user.

It is to be understood, various changes or modifications may be made to the embodiments without departing from the scope and spirit of the disclosure. For example, in other embodiments: 1) if the user inputs handwritten commands such as "x," "delete," or the like within the drawn circled region, the command identification module 441 then identifies the input handwritten command to be a deleting command, the content retrieving module 442 retrieves the circled content within the circled region and the control module 443 controls the electronic device 400 to delete the circled content. 2) if the user inputs handwritten commands such as "√," "copy," or the like within the drawn circled region, the command identification module 441 then identifies the input handwritten command to be a copy command, the content retrieving module 442 retrieves the circled content within the circled region and the control module 443 controls the electronic device 400 to copy the circled content. 3) if the user inputs handwritten commands such as "t," "translate," or the like within the drawn circled region, the command identification module 441 then identifies the input handwritten command to be a translation command, the content retrieving module 442 retrieves the circled content within the circled region and the control module 443 controls the electronic device 400 to translate the circled content with a language selected by the user. In a word, the user can select content of the displayed page by circling a region, and then writes a command on the circled content, then the electronic device 400 can identifies the command and executes the command by processing the circled content, which provides a convenient and easy control manner for the user. The present disclosure has been specifically described on the basis of the embodiments thereof, the disclosure is not to be construed as being limited thereto.

5. Handwritten Signature Identification

An exemplary embodiment of this disclosure provides a function for identifying handwritten signatures of users of the electronic device. When it is the first time for a user to activate the function for identifying handwritten signatures of the electronic device, the electronic device also invites the user to do a test for extracting the signature features of his/her handwritten signature, and stores a mapping relationship between a number of user identities (IDs)/names and a number of signature features of handwritten signatures associated with the corresponding user IDs/names of the user in a server or the electronic device for the future handwritten signature identification.

Figure 22:
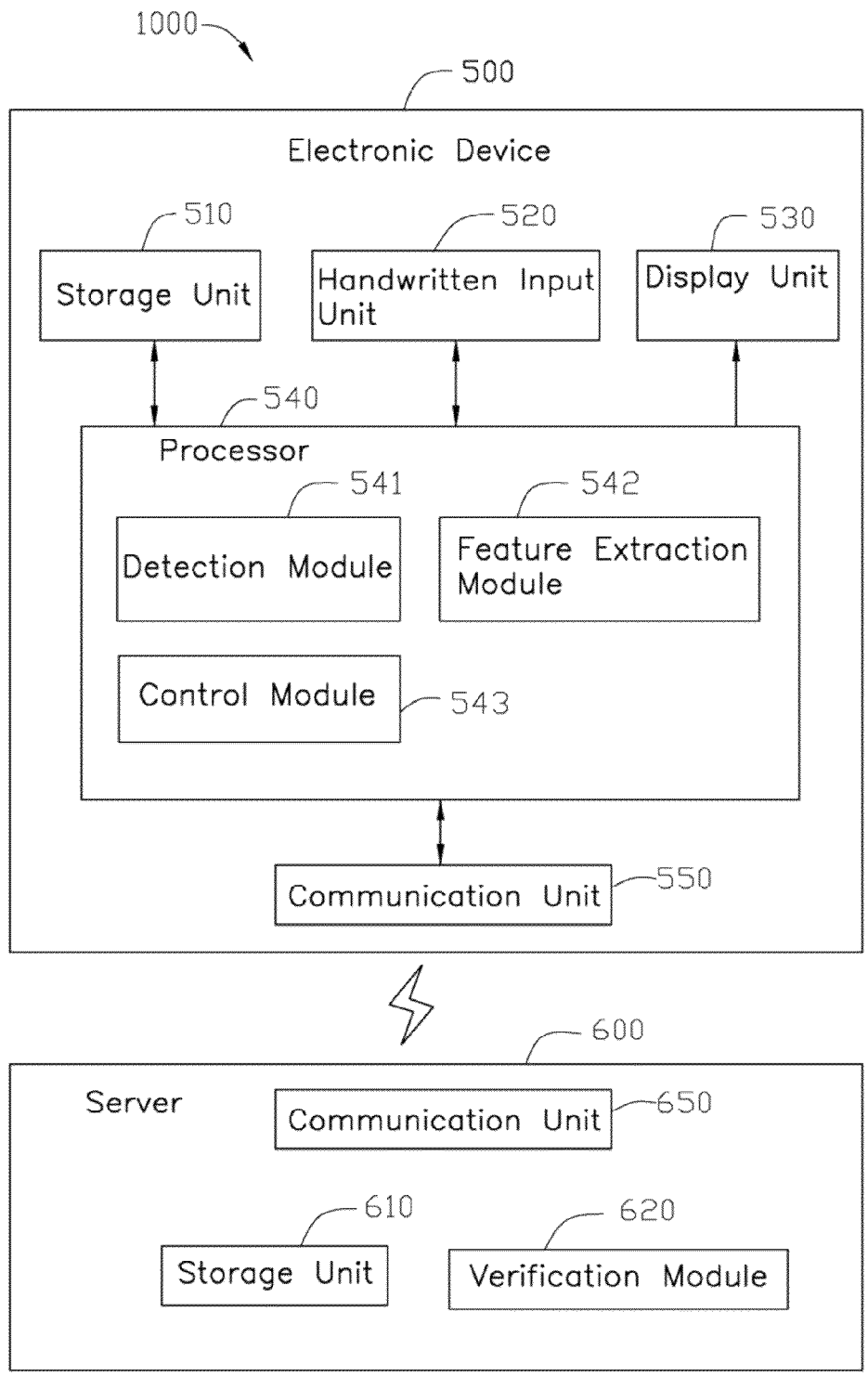
FIG. 22 is a schematic view of a system for extracting feature of signatures in accordance with an exemplary embodiment.

Referring to FIG. 22, an exemplary embodiment of a handwritten signature identification system 1000 including an electronic device 500 and a server 600 is provided. The electronic device 500 communicates with the server 600 via wired or wireless manners. The server 600 includes a storage unit 610, a verification unit 620, and a communication unit 630. The storage unit 610 stores a mapping relationship between a number of signature features of handwritten signatures and a number of user names. These signature features of handwritten signatures are extracted and stored during the test for extracting the signature features, which is done when it is the first time for the user to use the handwritten signature identification system 1000. The details of the process for extracting the signature features are described later. The server 600 can be managed and kept by a bank, or a corporation etc. The communication unit 630 is used for communicating with electronic device 500 or other devices. The verification unit 620 is used for comparing the signature features of a user transmitted from the electronic device 500 with the signature features of the handwritten signature of the user stored in the storage unit 610, to verify whether signature features are the same or the differences between the signature features fall within a predetermined acceptable difference range. The verification unit 620 also transmits the verified results to the electronic device 500.

The electronic device 500 includes a storage unit 510, a handwritten input unit 520, a display unit 530, a processor 540, and a communication unit 550. The storage unit 510 stores a mapping relationship between a number of signature files and a number of signature features of users. The handwritten input unit 520 generates signals in response to user's handwritten input. The communication unit 550 is used for communicating with other electronic devices such as the server 600. The processor 540 includes a detection module 541, a feature extraction module 542, and a control module 543. In an alternative embodiment, the electronic device 500 also includes all of the function units of the server 600. Thus the electronic device 500 also can verify the authenticity of the handwritten signature input by the user on the handwritten input unit 520. In the embodiment, the handwritten input unit 520 includes a touch sensing unit for sensing a touch input of a handwritten signature thereon by a user.

The detection module 541 is configured for detecting the coordinates (x, y) of each touch point of the handwritten signature during the handwriting process. The touch points of the handwritten signature form the signature trace. In the embodiment, "x" is an abscissa value relative to an established origin, and "y" is an ordinate value relative to the established origin. Setting the first touch point as the origin (0, 0) of the handwritten signature, for example, then the coordinates of other points of the handwritten signature are all relative to the origin (0, 0). The detection module 541 also stores the detected coordinates in the storage unit 510.

The feature extraction module 542 extracts the signature features of the handwritten signature input by the user according to the coordinates of each touch point of the handwritten signature detected by the detection module 541 and a predetermined extraction manner. In the embodiment, the predetermined extraction manner is to select a number of features points from the touched points and obtain coordinates of the feature points of the signature trace. The feature points of the signature trace are the touch points on the signature trace of the handwritten signature which reflect the signature features of the user and may differ from other's signature features. The feature points of the signature trace are selected from the group consisting of: the first point of the handwriting signature, the last point of the handwriting signature, the points having relative larger curvature (such as the points on the bent position of the signature trace), the points on the two ends of a horizontal line or a vertical line of a stroke, the lift point when the finger or the stylus of the user is lifted from the handwritten input unit 520 during the handwritten signature process, and the next touch point following a lift point etc. The extracted signature features include the mapping relationship between the number of feature points of the signature trace and the number of extracted coordinates associated with the corresponding feature points. That is, the extracted signature features include a combination of the selected features points and the coordinates thereof.

The control module 543 controls the communication unit 550 to transmit the extracted signature features of the handwritten signature of the user to the server 600. After the signature features of the handwritten signature of the user is verified by the server 600, the control module 543 further controls the display unit 530 to display the verification result transmitted from the server 600.

In an alternative embodiment, to improve the accuracy of the identification of the handwritten signature, the detection module 541 is further configured for detecting the three-dimensional coordinates (x, y, z) of each point of the handwritten signature during the handwritten signature process. In the embodiment, "z" is a value selected from the group consisting of: the value of the pressure touch by the user on of the point (the electrostatic signal strength of the point), the value of the time period between the touch point and the previous touch point, the time duration of the touch on the point, the size of the touch area (eg. footprint) of the touch point, the value of an angle relative to a referenced touch point (such as the origin), etc. The feature extraction module 542 extracts the signature features of the handwritten signature input by the user according to the three-dimensional coordinates of each point of the handwritten signature detected by the detection module 541 and a predetermined extraction manner.

If it is the first time for the user to use the electronic device 500, the control module 543 further controls the display unit 530 to display a dialog box to invite the user to provide an example of their signature for extracting features of the handwritten signature of the user. Then the user signs a signature region testing the dialog box. The function units such as the detection module 541, the feature extraction module 542 and the control module 543 execute the above described functions respectively. In the embodiment, the electronic device 500 will guide the user to provide at least three samples of their handwritten signature. That is, the user needs to input his/her handwritten signature at least three times to finish the signature feature extraction process. Because there will naturally be differences in the three samples, the feature extraction module 542 also calculates the average values of corresponding coordinates from the three samples. The feature extraction module 542 then processes the calculated average coordinates. The control module 543 controls the communication unit 550 to transmit the extracted the signature features of the handwritten signature of the user to the server 600 for storing in the storage unit 610. In an embodiment, the feature extraction module 542 also stores the extracted the signature features associated with the user name of the user in the storage unit 510.

Figure 23:
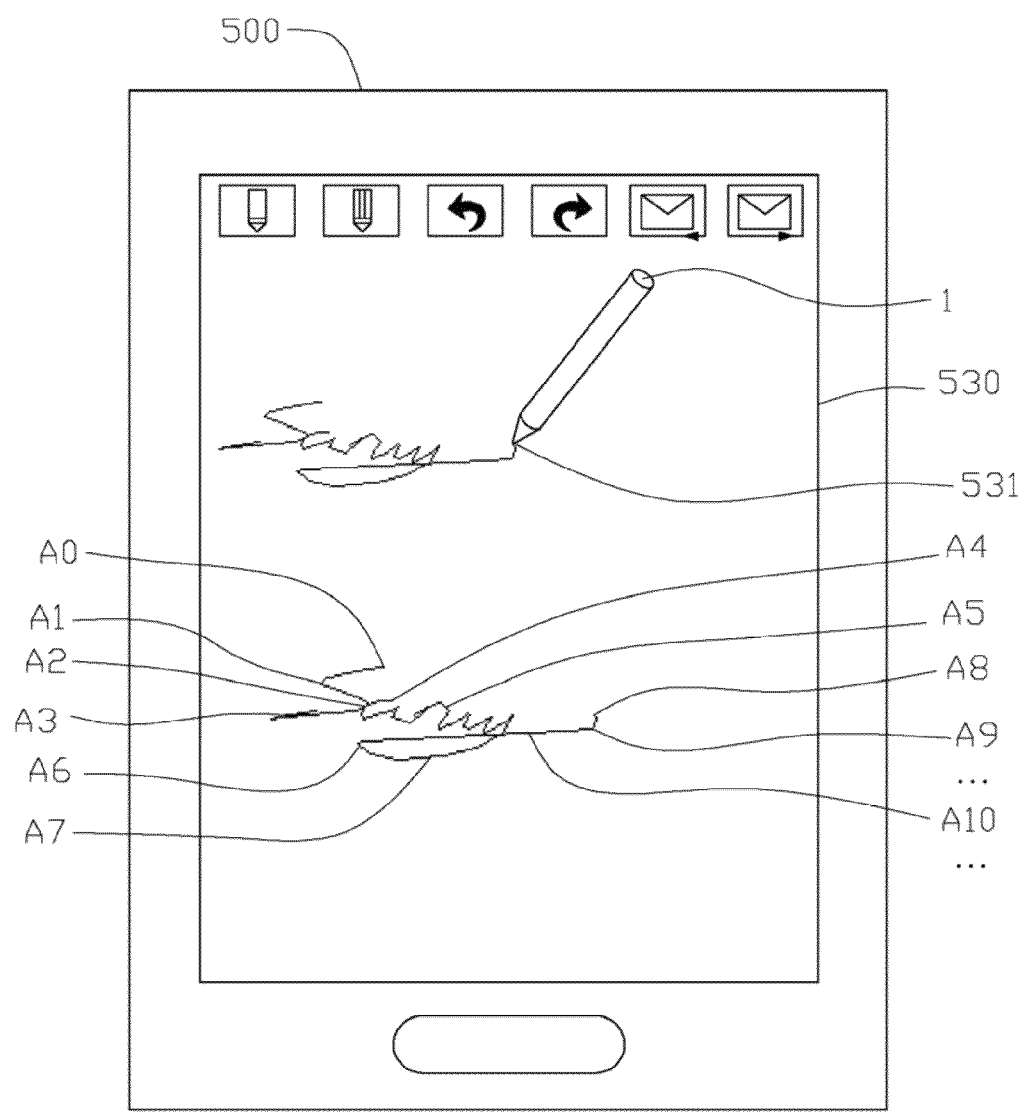
FIG. 23 is a schematic view showing the operation interface displayed on the electronic device of FIG. 22 in accordance with the exemplary embodiment.

Referring to FIG. 23, when the user input the handwritten signature 531, the detection module 541 detects the coordinates of all the coordinates of the points of the handwritten signature 531. The feature extraction module 542 extracts the signature features of the handwritten signature 531 according to the predetermined extraction manner. For example, the signature features of the following feature points reflecting the signature features of the user are extracted: A0, A1, A2, A3, A4, A5, A6, A7, A8, A9, A10, . . . . The coordinates of the feature point A0 are (0, 0), the coordinates of the other feature points are relative to the feature point A0. In an alternative embodiment, the detection module 541 also detects the three-dimensional coordinates of each point of the handwritten signature.

Figure 24:
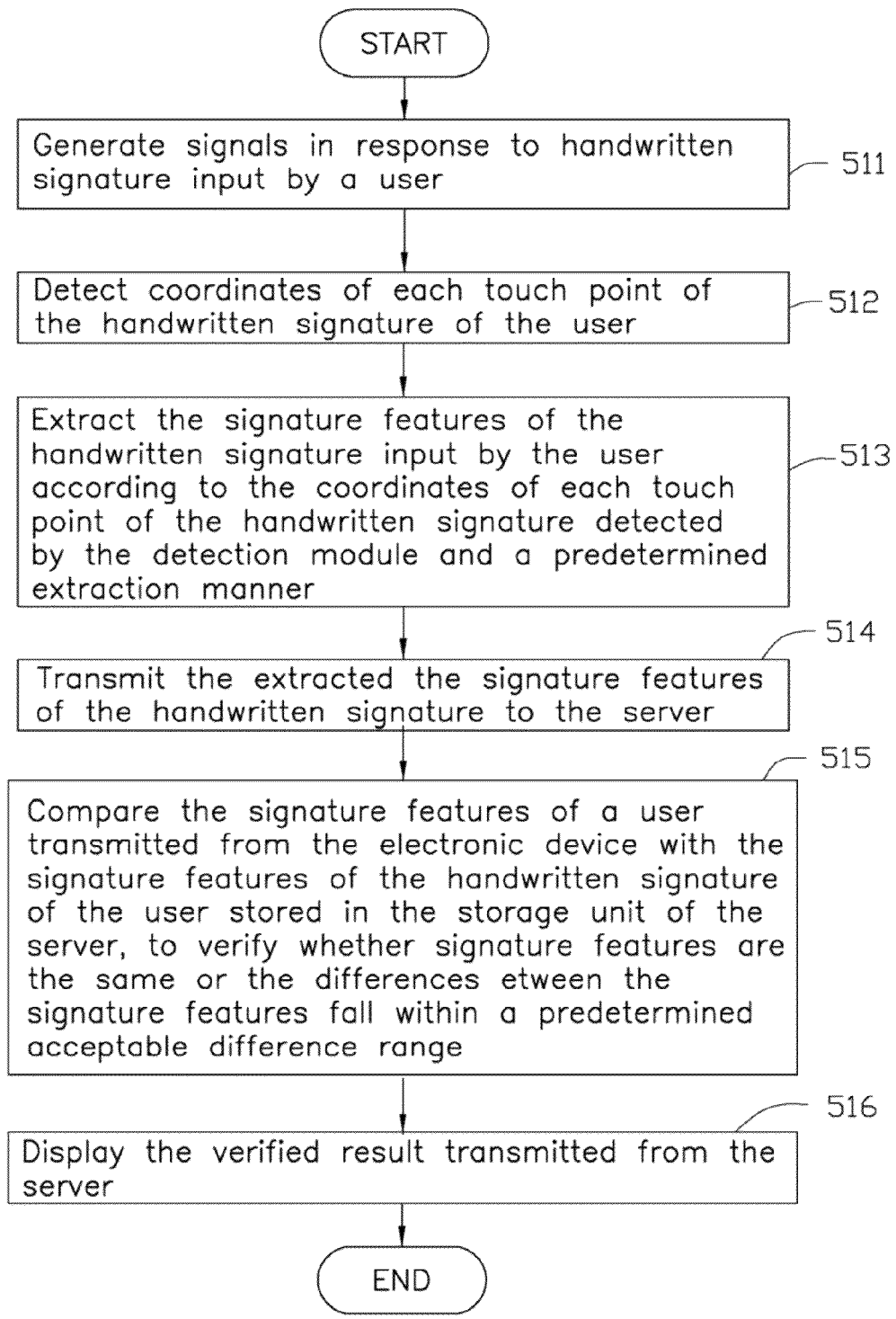
FIG. 24 is a flowchart of a method for extracting feature of signatures for electronic devices, such as the one of FIG. 22, in accordance with the exemplary embodiment.

FIG. 24 shows a flowchart of a method for identifying the handwritten signatures of users of the handwritten signature identification system 1000 of FIG. 22. The handwritten signature identification system 1000 includes an electronic device and a server. The method includes the following steps, each of which is related to the various components contained in the handwritten signature identification system 1000:

In step S511, the handwritten input unit 520 of an electronic device 500 generates signals in response to handwritten signature input by a user. In the embodiment, the handwritten input unit 520 includes a touch sensing unit for sensing a touch input of a handwritten signature thereon by a user.

In step S512, the detection module 541 of the electronic device 500 detects coordinates of each touch point of the handwritten signature of the user.

In step S513, the feature extraction module 542 of the electronic device 500 extracts the signature features of the handwritten signature input by the user according to the coordinates of each touch point of the handwritten signature detected by the detection module 541 and a predetermined extraction manner.

In step S514, the control module 543 of the electronic device 500 controls the communication unit 550 to transmit the extracted the signature features of the handwritten signature to the server 600.

In step S515, the verification module 620 of a server 600 compares the signature features of a user transmitted from the electronic device 500 with the signature features of the handwritten signature of the user stored in the storage unit 610 of the server 600, to verify whether signature features are the same or the differences between the signature features fall within a predetermined acceptable difference range. The server 600 also transmits the verified result to the electronic device 500 via the communication unit 630.

In step S516, the control module of the electronic device 500 controls the display unit 530 to display the verified result transmitted from the server 600.

6. The Written Signature Used as a Password

Figure 25:
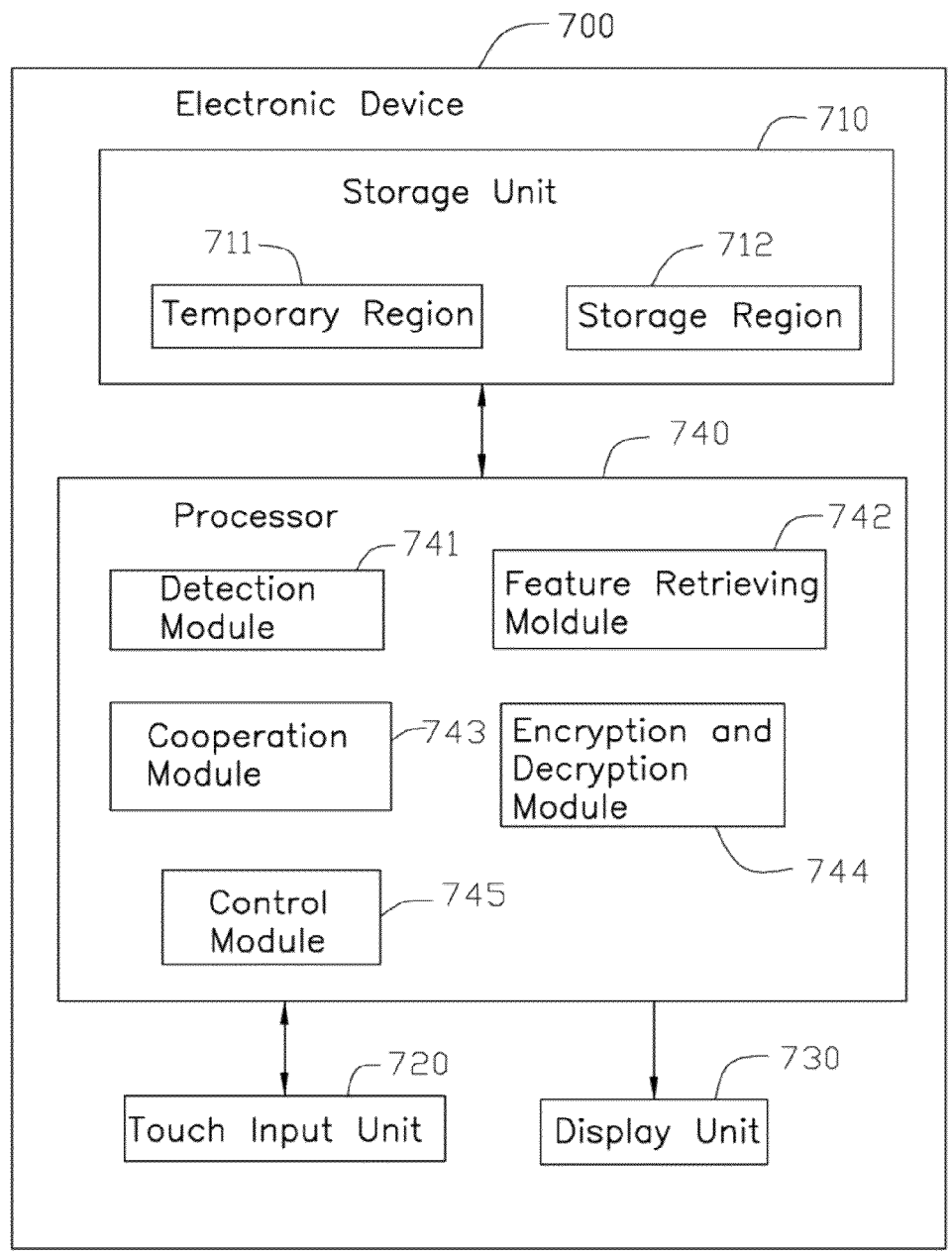
FIG. 25 is a block diagram of an electronic device in accordance with an exemplary embodiment.

In an exemplary embodiment, the electronic device of this disclosure encrypts/decrypts an file using the signature features of a user. Referring to FIG. 25, the electronic device 700 includes a storage unit 710, a touch input unit 720, a display unit 730, and a processor 740.

The display unit 730 is used for displaying electronic files and menu bar for a user. The menu bar includes the conventional items such as copy, paste, delete, and cut. The menu bar also includes an encryption item and a decryption item. The storage paths for the encryption item and the decryption item are predetermined. After the user selects the encryption or the decryption item, the display unit 730 displays an interface for the user to input a password. In the embodiment, the password is the handwritten signature of a user. And after the password input by the user is verified, the display unit 730 displays corresponding interfaces for the user. The touch input unit 720 can be a portable device having touch input function or a touch screen equipped on the electronic device 700, for generating signals in response to user input. In the embodiment, the touch input unit 720 includes a sensing unit, thus allows users to select an electronic file for encrypting or decrypting, senses users' touch input of handwritten signatures and generates signals in response to the touch input of the handwritten signature.

The processor 740 includes a detection module 741, a feature extraction module 742, a comparing module 743, an encryption and decryption module 744, and a control module 745. The detection module 741 detects the two-dimensional coordinates (x, y) or three-dimensional coordinates (x, y, z) of each point of the handwritten signature of the user according to the generated signals. The feature extraction module 742 extracts the signature features of the handwritten signature input by the user according to the two-dimensional or three-dimensional coordinates of each touch point of the handwritten signature detected by the detection module 741 and a predetermined extraction manner. The feature extraction module 742 stores the extracted signature features of the handwritten signature of the user in the storage unit 710. The feature extraction module 742 also stores the digital signals corresponding to the extracted signature features as a password in the storage unit 710. The stored password is used for encrypting/decrypting files. The encryption and decryption module 744 is configured for encrypting/decrypting a file selected by the user using the stored password—the extracted signature features of the handwritten signature of the user. In the embodiment, the password input by the user for decrypting files is temporarily stored in a temporary region 711 of the storage unit 710, and the extracted password for encrypting and decrypting files is stored in the storage region 722 of the storage unit 710.

The comparing module 743 is configured for comparing the password input by the user and the password stored in the storage region 722, to determine whether the passwords are the same, if yes, the comparing module 743 transmits a signal indicating the input password is correct to the control module 745, otherwise, the comparing module 743 transmits a signal indicating the input password is wrong to the control module 745. In the decryption process, the feature extraction module 742 directly provides the password to the comparing module 743.

The control module 745 receives the signal transmitted from the comparing module 743, and controls the electronic device 700 to execute the next process. That is, if the received command indicating the input password is correct, the control module 745 decrypts the encrypted file and controls the electronic device 700 to execute various functions in response to user's operation. If the received command indicating the input password is wrong, the control module 745 creates a command for prompting the user that the input password is wrong, and controls the display unit 730 to display the command via characters, and prompts the user to re-enter the password.

Figure 26:
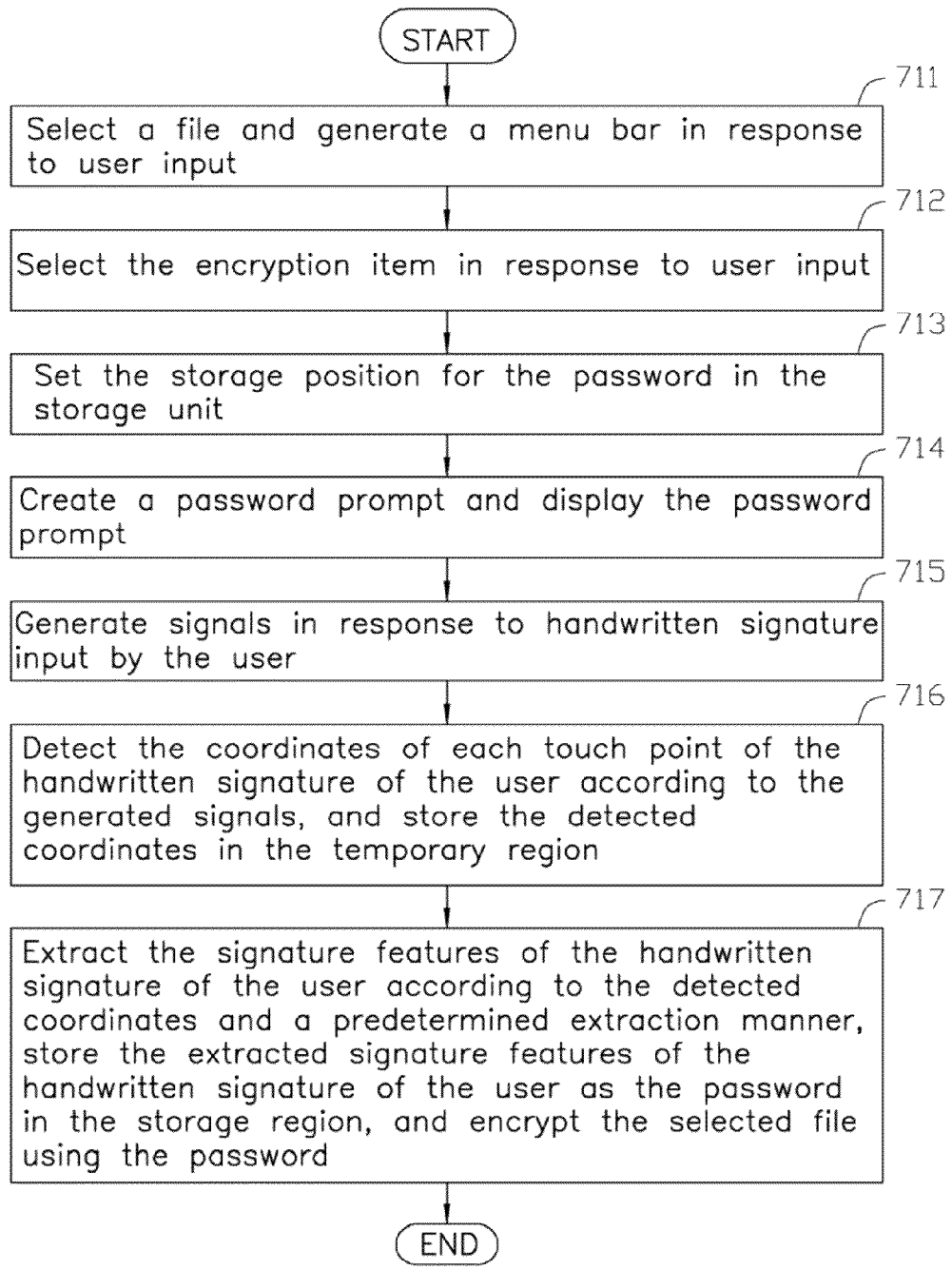
FIG. 26 is a flowchart of an encryption method for electronic devices, such as the one of FIG. 25, in accordance with the exemplary embodiment.

FIG. 26 shows a flowchart of an encryption method for the electronic device 700 of FIG. 25. The method includes the following steps, each of which is related to the various components contained in the electronic device 700:

In step S711, selecting a file and generating a menu bar in response to user input. The menu bar includes an encryption item and a decryption item.

In step S712, selecting the encryption item in response to user input.

In step S713, setting the storage position for the password in the storage unit 710.

In step S714, creating a password prompt and displaying the password prompt.

In step S715, generating signals in response to handwritten signature input by the user.

In step S716, detecting the coordinates of each touch point of the handwritten signature of the user according to the generated signals, and storing the detected coordinates in the temporary region 711. In the embodiment, the detected coordinates of the touch points of the handwritten signature can be two-dimensional coordinates (x, y) or three-dimensional coordinates (x, y, z).

In step S717, extracting the signature features of the handwritten signature of the user according to the detected coordinates and a predetermined extraction manner, storing the extracted signature features of the handwritten signature of the user as the password in the storage region 722, and encrypting the selected file using the password.

Figure 27:
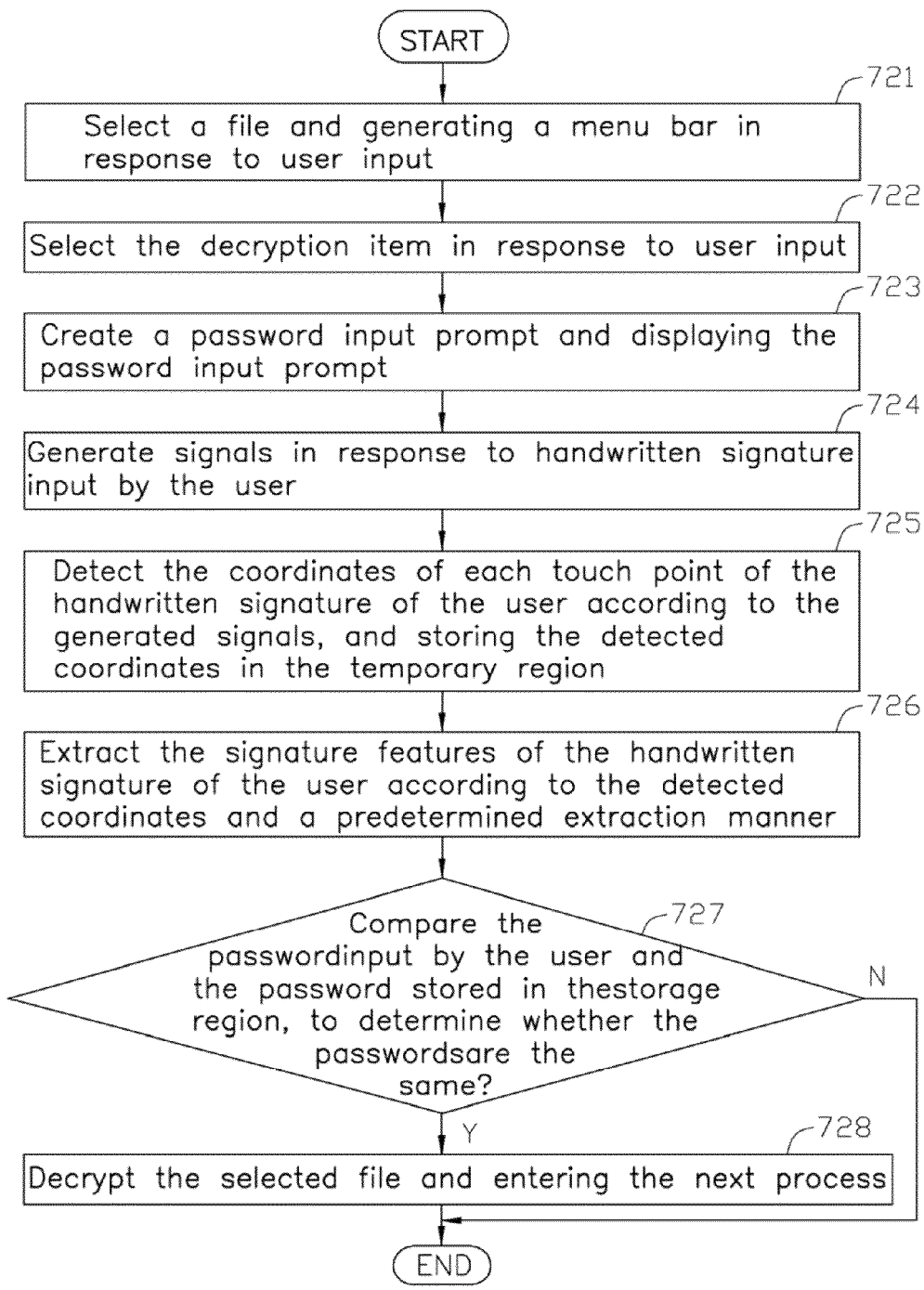
FIG. 27 is a flowchart of a decryption method for electronic devices, such as the one of FIG. 25, in accordance with the exemplary embodiment.

FIG. 27 shows a flowchart of a decryption method for the electronic device 700 of FIG. 25. The method includes the following steps, each of which is related to the various components contained in the electronic device 700:

In step S721, selecting a file and generating a menu bar in response to user input. The menu bar includes an encryption item and a decryption item.

In step S722, selecting the decryption item in response to user input.

In step S723, creating a password input prompt and displaying the password input prompt.

In step S724, generating signals in response to handwritten signature input by the user.

In step S725, detecting the coordinates of each touch point of the handwritten signature of the user according to the generated signals, and storing the detected coordinates in the temporary region 711. In the embodiment, the detected coordinates of the touch points of the handwritten signature can be two-dimensional coordinates (x, y) or three-dimensional coordinates (x, y, z).

In step S726, extracting the signature features of the handwritten signature of the user according to the detected coordinates and a predetermined extraction manner.

In step S727, comparing the password input by the user and the password stored in the storage region 722, to determine whether the passwords are the same, if yes, the processor goes to step S728, otherwise, the process ends.

In step S728, decrypting the selected file and entering the next process.

With such a configuration, the user can encrypt and/or decrypt the target (such as a file) by inputting his/her handwritten signature, which is convenient and secure. Furthermore, the user does not need to remember a complex password anymore.

7. Office System and Safety Certification Method for Signatures Thereof

Figure 28:
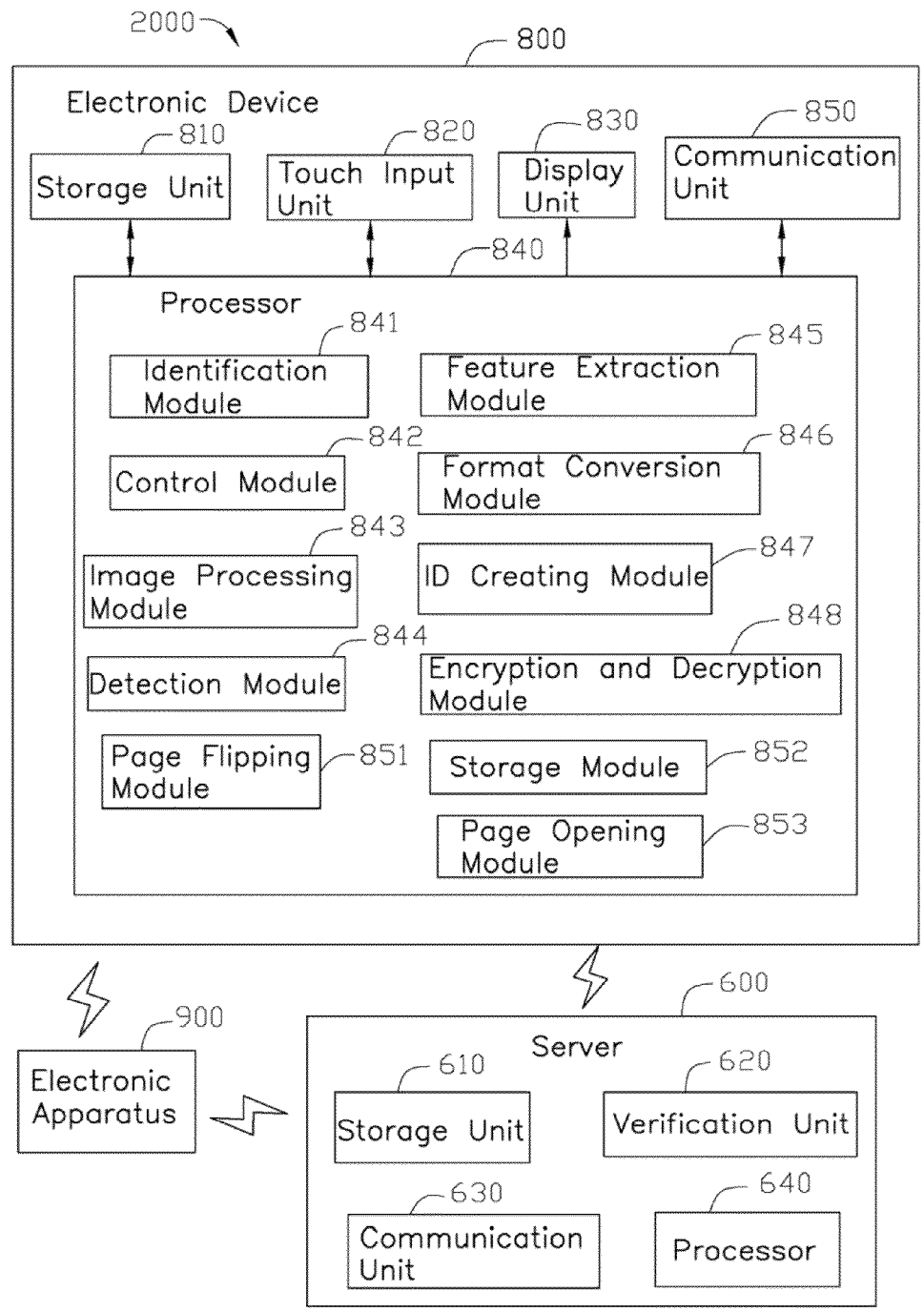
FIG. 28 is a schematic dialog of a signature verification system in accordance of an exemplary embodiment.

Referring to FIG. 28, an exemplary office system 2000 includes at least one electronic device 800, an electronic apparatus 900, and a server 600. The electronic device 800, the electronic apparatus 900, and the server 600 communicate with each other via wired or wireless manner. The electronic device 800 is a super notebook having a touch input unit and a handwriting input function. In alternative embodiments, the electronic device 800 can be other commercial or personal electronic devices having touch input units and handwriting input functions, such as a mobile phone, a personal digital assistant, an electronic reader, a tablet computer, or a digital phone frame, for example. The electronic apparatus 900 can be a same device as the electronic device 800 or a different device. In the embodiment, the electronic apparatus 900 includes the all the function units and components of the electronic device 800.

In the embodiment, when the electronic device 800 is powered on, the user can select an item displayed on the electronic device 800 to receive and open an e-mail or select a file/document to-be-signed from a common region or a website. The file/document to-be-signed is sent from a sender. When the user determines to sign on the file/document to-be-signed, the user can open the file/document to-be-signed and signs his/her name on a predetermined position (such as the signature field) on the touch input unit of the electronic device 800. The electronic device 800 automatically creates a feature file of the user. The created feature file of the user is invisible to users of the electronic device 800 and includes a user identity (ID) of the user and signature features of the handwritten signature of the user. If the user selects to reply the e-mail to the sender or selects a recipient by applying a command on the touch input unit or selecting an item displayed on the electronic device 800, the electronic device 800 then automatically encrypts the signed file/document by the user (having the handwritten signature of the user) using the created feature file of the user, and packages the encrypted file/document to a signed file having a HTML format. The electronic device 800 also transmits the packaged signed file having the HTML format to the e-mail or the recipient or a designated region selected by the user.

In the embodiment, the user ID is a unique ID and created according to the signature features of the handwritten signature of the user, for representing the identity of the user. That is, each handwritten signature associated with an ID of a user, and the handwritten signatures having the same signature features associates with a same user ID of a user. In an alternative embodiment, the electronic device 800 also automatically adds at least one of the following information: the ID of the electronic device 800, the title of the receiver (such as manager, or president etc.), the location that the receiver signs the file/document, the fingerprint of the receiver, the photo of the receiver, and the GPS data of the signed location.

In the embodiment, the electronic device 800 and electronic apparatus 900 display the file/document to-be-signed one page at a time, that is, when the user opens the file/document to-be-signed, the electronic device 800 and electronic apparatus 900 display one page on the display unit thereof and remaining pages are provided one at a time according to user input. The electronic apparatus 900 can also transmit the file/document to-be-signed to the electronic device 800 one page at a time rather than as a whole single file. The user of the electronic device 800 adds comments on the pages and signs his/her signature on the page, and the electronic device 800 can transmit the signed file/document to the electronic apparatus 900 one page at a time so that the user does not have to have finished reading and signing all pages of the file before transmission of completed parts begins. Thus, during the office procedures of the office system 2000, the electronic files are displayed, transmitted, and received in page form. The written content (including the handwritten signatures and the comments written by the user) is in electronic file form, rather than in paper form as used in the conventional signing process, which is environmentally sound. In some embodiments, the electronic device 800 and the electronic apparatus 900 perform as electronic "paper notebooks," which provide a familiar feeling for users who are accustomed to using paper while providing a paperless environment. The office system 200 saves on paper, thus saving on office expenses, and is environmentally friendly, energy-saving, and convenient.

For better understanding of this disclosure, the user of the electronic apparatus 900 is presumed to be the sender, and the user of the electronic device 800 is presumed to be the receiver. In the embodiment, the electronic apparatus 900 transmits the electronic file to-be-signed to the e-mail of the receiver or the electronic device 800 via wired or wireless manner. The server 600 stores the feature file of the receiver indicating the signature features of the handwritten signature of the receiver. The details for creating and extracting the signature features of the handwritten signatures can be found in the fifth part of this disclosure.

The electronic device 800 includes a storage unit 810, a touch input unit 820, a display unit 830, a processor 840, and a communication unit 850. The storage unit 810 stores at least an electronic file and a relationship table 112. The electronic files are stored in pages, that is, the electronic files are scattered pages for storing and displaying. The electronic device 800 stores the received electronic file in one or more pages in the storage unit 810, and numbers the pages of the received electronic file and the latterly received files in sequence. When the content of an electronic file is distributed on more than one pages, the electronic device 800 and the electronic apparatus 900 also record the relationship between the pages which cooperatively present the whole content of the electronic file.

The processor 840 includes an identification module 841, a control module 842, and an image processing module 843. The image processing module 843 creates an image of the written content in response to user input. The control module 842 is configured for controlling the display unit 830 to display the created image. The identification module 841 is configured for identifying the command of the user according to the signals generated by the touch input unit 820, and retrieving the command associated with the identified command from the relationship table 112 (see FIG. 2). The control module 842 is further configured for controlling the corresponding function modules of the electronic device 800 to execute the command retrieved by the identification module 841.

Figure 29:
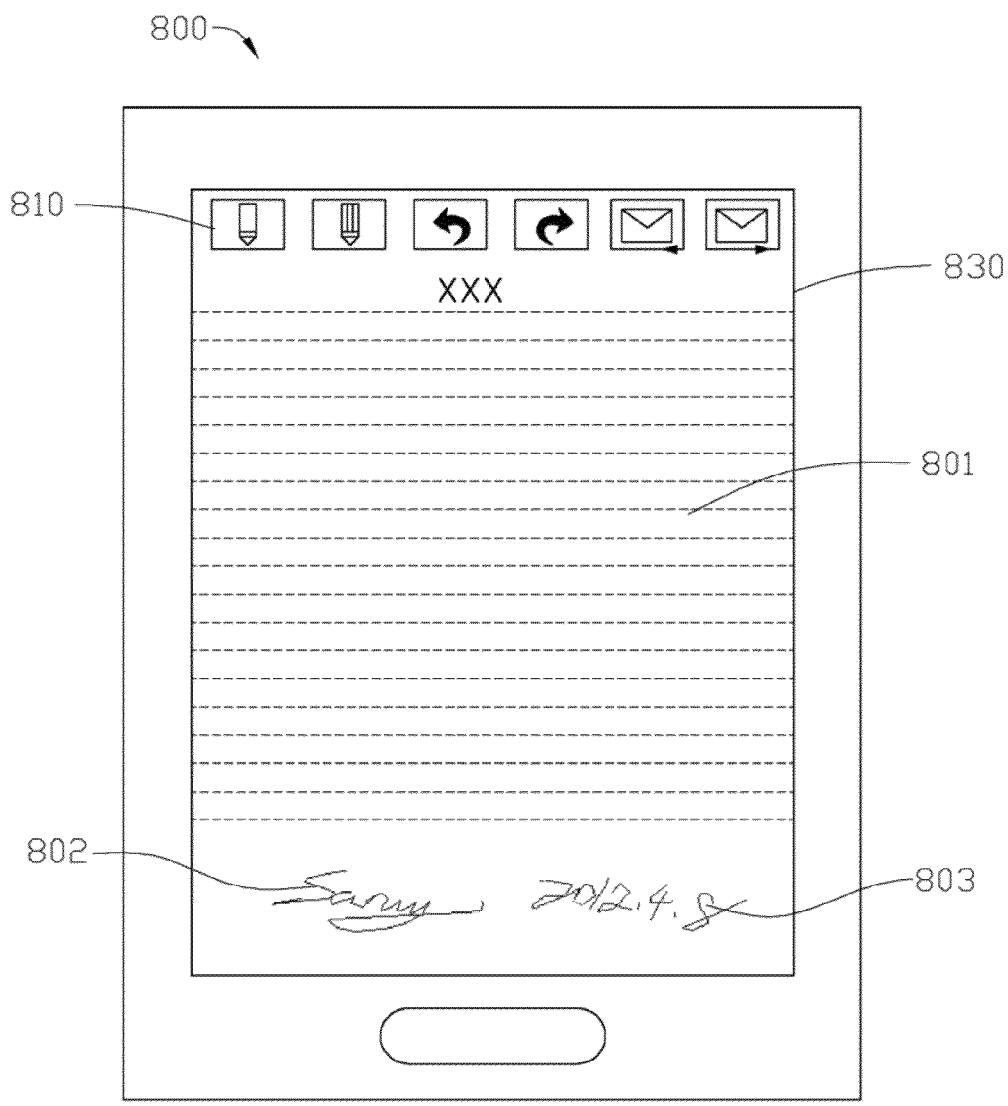
FIG. 29 is a schematic view showing the operation interface displayed on an electronic device of signature verification systems, such as the one of FIG. 28, in accordance with the exemplary embodiment.

Referring to FIGS. 28 and 29, when the receiver opens the to-be-signed electronic file 801 on the electronic device 800, the receiver can select the stylus button 811 displayed on the top of the display unit 830 on the touch input unit 820. Then the electronic device 800 enters the handwriting input mode, the user can input touch input on the touch input unit 820. The display unit 830 real-timely displays the written content which is the same as the written trace of the user. In an alternative embodiment, the electronic device 800 automatically enters the handwritten input mode when the electronic file selected by the user is displayed on the display unit 830 or when the electronic device 800 is powered on.

When the receiver signs his/her signature on the displayed electronic file 801, the touch input unit 820 identifies the touch trace of the receiver. The image processing module 843 creates images according to the identified touch trace. The control module 842 controls the display unit 830 to display the created images. Referring to FIG. 29, the signature 802 and the signed date 803 of the receiver are displayed on the electronic file 801. The user of the electronic device 800 also can add comments such as "ok," "agree" etc. on the electronic file 801. The control module 842 stores the comments added by the user and the signature associated with the electronic file 801 in the storage unit 810. Thus, when the user opens the electronic file 801, the display unit 830 will display the content of the electronic file 801 and the associated signature and added comments.

As shown in FIG. 28, the processor further includes a detection module 844, a feature extraction module 845, a format conversion module 846, an ID creating module 847, and an encryption and decryption module 848. The detection module 844 is configured for detecting the coordinates of each point of the handwritten signature during the handwriting process, and storing the detected coordinates in the storage unit 810. In the embodiment, the detected coordinates can be two-dimensional coordinates (x, y) or three-dimensional coordinates (x, y, z). The feature extraction module 845 extracts the signature features of the handwritten signature input by the user according to the coordinates of each point of the handwritten signature detected by the detection module 844 and a predetermined extraction manner. In the embodiment, the predetermined extraction manner is to extract coordinates of a number of feature points of the signature trace. The feature points of the signature trace are the points on the signature trace of the handwritten signature which reflect the signature features of the user and may differ from other's signature features. The feature points of the signature trace are selected from the group consisting of: the first point of the handwriting signature, the last point of the handwriting signature, the points having relative larger curvature (such as the points on the bent position of the signature trace), the points on the two ends of a horizontal line or a vertical line of a stroke, the lift point when the finger or the stylus of the user leaves the touch input unit 820 during the handwritten signature process, and the point following a lift point etc. The control module 842 controls the communication unit 850 to transmit the extracted signature features of the handwritten signature of the user to the server 600.

The server 600 includes a storage unit 610, a verification unit 620, a communication unit 630, and a processor 640. The storage unit 610 stores a mapping relationship between a number of signature features of handwritten signatures and a number of user names/IDs. The communication unit 630 is used for communicating with electronic device 800, electronic apparatus 900 or other devices. The communication unit 630 receives the extracted signature features and user names from the electronic apparatus 900, and receives the extracted signature features and user names/IDs from the electronic device 800. The verification unit 620 is used for comparing the extracted signature features of a user transmitted from the electronic device 800 or the electronic apparatus 900 with the signature features of the handwritten signature associated with the user name/ID stored in the storage unit 610, to verify whether the signature features are the same or the differences between the signature features fall within a predetermined acceptable difference range. The verification unit 620 also transmits the verified results to the electronic device 800 and/or the electronic apparatus 900.

When the sender—the user of the electronic apparatus 900 wants to send the to-be-signed electronic file to the receiver—the user of the electronic device 800, the sender selects a communication address such as the e-mail address or a fax number (eg. telephone number) of the receiver, and then transmits the to-be-signed electronic file to the receiver of the electronic device 800 via a wired or wireless manner. In the embodiment, when the sender opens a page of an electronic file, and tells the electronic apparatus 900 to send the electronic file by a predetermined command, the electronic apparatus 900 will display an interface showing the selective pages for the user to select. The user can select to send one or more pages displayed on the interface to the receiver.

When the receiver attempts to open the electronic file sent by the sender, the server 600 sends a request to invite the receiver of the electronic device 800 to enter a user name and a password. In the embodiment, the password is the handwritten signature of the receiver. The feature extraction module 845 of the electronic device 800 extracts the signature features of the handwritten signature of the receiver according to the handwritten signature input by the receiver. The details are described above. Then electronic device 800 then transmits the extracted the signature features of the receiver to the server 600. The verification unit 620 of the server 600 then verifies the extracted the signature features of the receiver.

After the extracted the signature features of the receiver are verified by the server 600, the control module 842 further controls the display unit 830 to displayed the verified result transmitted from the server 600. In an alternative embodiment, when the receiver attempts to open the electronic file sent by the sender, the server 600 does not send a request to invite the receiver of the electronic device 800 to enter a user name and a password. The electronic device 800 directly opens and displays electronic file transmitted from the sender. The server 600 may send a request to invite the receiver of the electronic device 800 to enter a user name and a password when the receiver finishes signing his/her signature or when the electronic apparatus 900 receives the signed electronic file.

In the embodiment, when the verification unit 620 of the server 600 determines that the handwritten signature of the receiver has passed the verification, that is, the handwritten signature of the receiver is verified to be true, the electronic 800 then opens the electronic file in response to the receiver's operation. When the receiver has signed the electronic file and has added comments on the electronic file, and selects to send the signed electronic file back to the sender by inputting a command or click a button displayed on the display unit 830, the format conversion module 846 converts the signed electronic file 801 including the content of the to-be-signed electronic file, the signature 802 of the receiver, the signed date 803 and the comments added by the receiver to an electronic file having a HTML format. The encryption and decryption module 848 encrypts the converted electronic file having the HTML format using the feature file of the receiver extracted by the feature extraction module 845. The ID creating module 847 creates an ID of the receiver according to the signature features of the receiver. The created ID of the receiver is a unique code representing and associated with the receiver. In the embodiment, the created ID of the receiver is the ID of the receiver. The ID creating module 847 also adds the created ID of the receiver on the upper right corner of the encrypted electronic file having the HTML format. For example, the created ID of the receiver is not encrypted and is visible by users.

If the encrypted electronic file having the HTML format includes more than one page, the created ID of the receiver is added on the upper right corner of the first page. In an alternative embodiment, the created ID of the receiver is added and displayed on a non-confidential or unsealed region of the encrypted electronic file having the HTML format.

The control module 842 controls the communication unit 850 to transmit the encrypted electronic file having the HTML format and added the created ID of the receiver to the communication address selected by the receiver. In the embodiment, the encrypted electronic file having the HTML format and added the created ID of the receiver is received by the sender of the electronic device 900.

In an alternative embodiment, the control module 842 of the electronic device 800 also automatically adds at least one of the following information: the ID of the electronic device 800, the title of the receiver (such as manager, or president etc.), the location that the receiver signs the electronic file/ document, the fingerprint of the receiver, the photo of the receiver, and the GPS data of the signed location.

In an embodiment, the office system 2000 does not automatically verify the signature of the receiver of the electronic device 800. Instead, when the signed electronic file is received, the sender of the electronic apparatus 900 sends a request for verifying the signature of the receiver to the server 600.

To facilitate the description, the function units/modules of the electronic device 800 are considered as the unction units/modules of electronic apparatus 900 in the following descriptions, since the electronic device 800 and the electronic apparatus 900 include the same function units/modules.

When the sender of the electronic apparatus 900 receives the signed electronic file—the encrypted electronic file having the HTML format and added the created ID of the receiver, the only visible content is the added ID of the receiver on the upper right corner. The other content of the signed electronic file is encrypted and is invisible and cannot open. The identification module 841 is configured for identifying the added ID of the receiver on the upper right corner. The control module 842 controls the electronic apparatus 900 to send a request for decrypting the signed electronic file to the server 600 via the communication unit 850.

For safety reasons, in the embodiment, when the request for decrypting the signed electronic file is received, the processor 640 controls the server 600 to send a request for inviting the sender of the electronic apparatus 900 to enter a user name and a password for verifying the identity of the sender. The password is the handwritten signature of the sender. The feature extraction module 845 of the electronic apparatus 900 extracts the signature features of the handwritten signature of the sender according to the handwritten signature input by the sender. The ID creating module 847 creates an ID of the sender according to the signature features of the sender. The created ID of the sender is a unique code representing and associated with the sender. The server 600 verifies whether the signature features of the handwritten signature of the sender transmitted from the electronic apparatus 900 is the same as the signature features associated with the ID of the sender stored in the storage unit 610, or whether the differences between the signature features fall within a predetermined acceptable difference range. If the server 600 has verified the signature of the sender to be true, the processor 640 decrypts the electronic file for the electronic apparatus 900.

In an alternative embodiment, after the request for decrypting the signed electronic file is received and the signature of the sender of the electronic apparatus 900 is verified, the processor 640 further controls the server 600 to send a request for inviting the sender of the electronic apparatus 900 to send the ID of the receiver added on the upper right corner of the signed electronic file. When the ID of the receiver added on the upper right corner of the signed electronic file is received, the server 600 further compares the received ID with the IDs stored in the storage unit 610, to find the same ID and associated signature features from the storage unit 610. The processor 640 further creates a password according to the found signature features associated with the ID. The created password is used for decrypting the signed electronic file and only can be used for one time. The processor 640 also controls the communication unit 630 to transmit the created password to the electronic apparatus 900. When the created password is received, the encryption and decryption module 848 of the electronic apparatus 900 decrypts the signed electronic file. The sender then can open the decrypted electronic file signed by the receiver of the electronic device 800.

In an embodiment, the ID added on the upper right corner of the signed electronic file includes the information of the sender (the receiver) and the recipient (the sender) of the signed electronic file. In the embodiment, the processor 840 of the electronic device 800/electronic apparatus 900 further includes a page flipping module 851, a storage module 852, and a page opening module 853. The electronic files of the electronic device 800/electronic apparatus 900 are stored and displayed in pages. The page opening module 853 opens a page and displays the page on the display unit 830. When the electronic device 800 or the electronic apparatus 900 is powered on, and the storage unit 810 is opened by the user, the display unit 830 then displays icons associated with the pages. Each icon is associated with a page. And the name of each page is the page number. After the user has opened a page, the page flipping module 851 then identifies the flipping commands of the user and controls the display unit 830 to display the desired page. If the last page of the electronic files is displayed, and the user still wants to turn to a next page, the display module 830 will display a blank new page numbered after the pages to the user. The storage module 852 then stores the new page follows the pages of the electronic files in the storage unit 810. That is, the storage module 852 creates a new icon associated with the new page and ranks the new icon after the icons. If the user writes content on the new page, the storage module 852 also real-timely or from time to time stores the written content on the new page in the storage unit 810. In an alternative embodiment, the user can manually store the written content and the new page in the storage unit 810. The electronic device 800 and the electronic apparatus 900 also provide a deleting function for the user. The user can deletes part of the content of a page or deletes a page (see the first part of this disclosure). The electronic device 800 and the electronic apparatus 900 also renumbers the page number of the pages when one or more pages has been deleted.

In another embodiment, the electronic device 800 is an office device. The touch input unit 820 displays a handwriting input screen for allowing a user perform a touch input of a handwritten note thereon and generates signals in response to user's touch input of the handwritten note. The page flipping module 851 detects a page flipping gesture on the handwriting input screen by the user. The storage module 810 stores content of the handwritten note displayed on the handwriting input screen in the storage unit if the page flipping gesture is detected. The image processing module 843 detects and recognizes touch input of a handwritten signature of the user on the handwriting input screen. The format conversion module 846 combines the handwritten note and the handwritten signature into a file and converts the file into a predetermined format. Then the control module 842 controls transmitting the file having the predetermined format to an electronic device (eg. the electronic apparatus 900). The predetermined format is the HTML format. In this embodiment, the storage module 810 further stores a received electronic file from the electronic apparatus 900. The received electronic file including a number of pages in the storage unit 810. The storage module 810 further combines the received electronic file with an electronic file stored in the storage unit 810, to form a new electronic file, and stores the new electronic file in the storage unit 810. The storage unit 810 is configured to repaginate the number of pages derived from the received electronic file in the new electronic file.

With such a configuration, the office system 2000 verifies the signature of the user using the server 600, and uses the extracted signature features of the handwritten signature of the user as the password of an electronic file. Thus, it reduces the possibility of electronic file with forged or tampered content, and reduces the possibility of forged signatures. The electronic office safety is greatly improved. The office system 2000 is also paperless thus is more efficient, convenient, and environmental sound.

Figure 30:
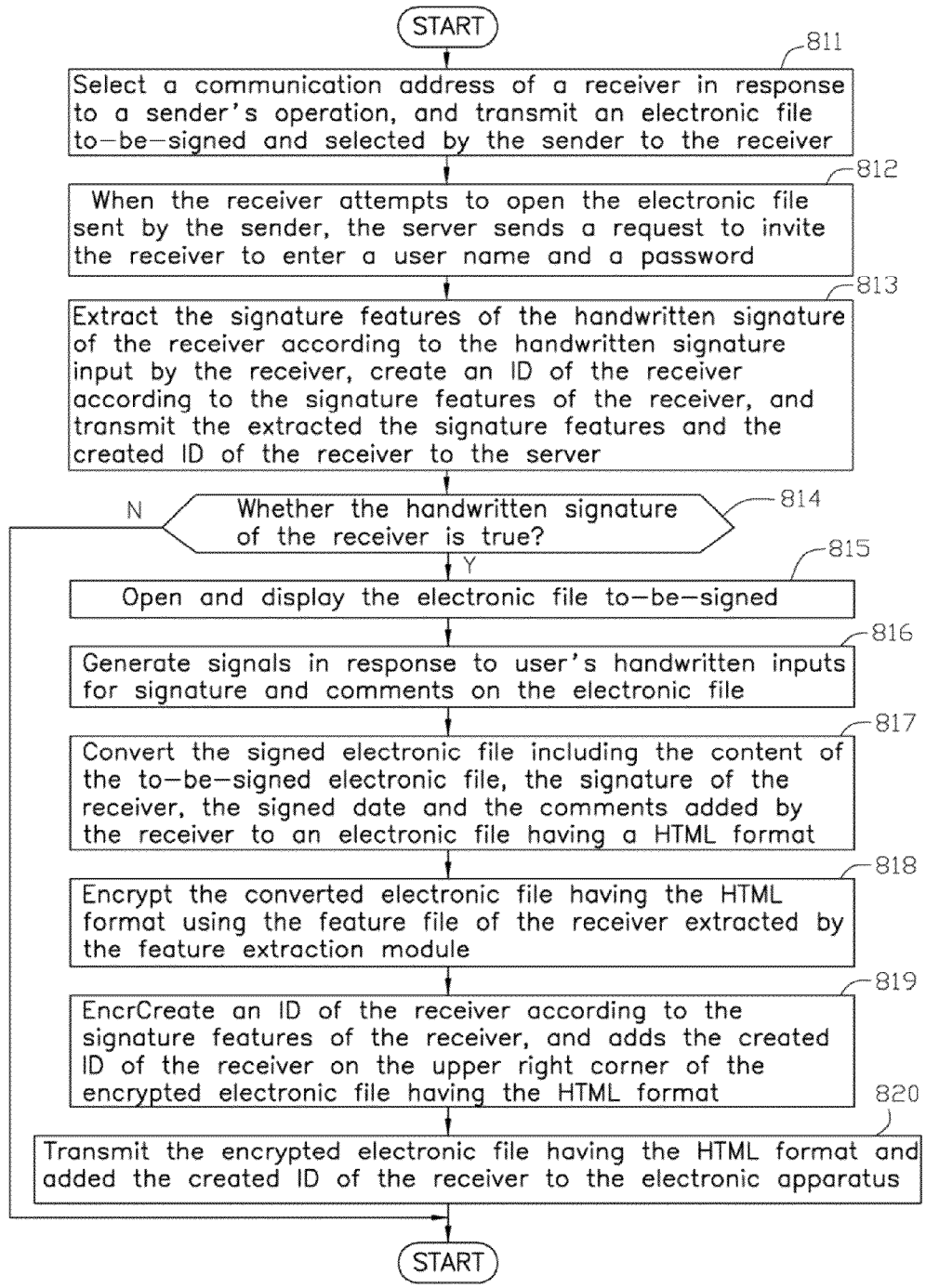
FIG. 30 is a method for verifying signatures for signature verification systems, such as the one of FIG. 28, in accordance with the exemplary embodiment.

FIG. 30 shows a flowchart of a signed file encryption method of a safety certification method for signatures of the office system 2000. The office system 2000 includes at least one electronic device 800, an electronic apparatus 900, and a server 600. The server 600 includes a storage unit 610, a verification unit 620, a communication unit 630, and a processor 640. The storage unit 610 stores a mapping relationship between a number of signature features of handwritten signatures and a number of user names/IDs. The method includes the following steps, each of which is related to the various components contained in the office system 2000:

In step S811, electronic device 900 selects a communication address (an e-mail address or a telephone number) of a receiver in response to a sender's operation, and transmits an electronic file to-be-signed and selected by the user to the receiver of the electronic device 800. In the embodiment, the user of the electronic apparatus 900 is presumed to be the sender, and the user of the electronic device 800 is presumed to be the receiver.

In step S812, when the receiver attempts to open the electronic file sent by the sender, the server 600 sends a request to invite the receiver of the electronic device 800 to enter a user name and a password. In an embodiment, this step can be omitted.

In step S813, the feature extraction module 845 of the electronic device 800 extracts the signature features of the handwritten signature of the receiver according to the handwritten signature input by the receiver, the ID creating module 847 creates an ID of the receiver according to the signature features of the receiver, and the communication unit 850 transmits the extracted the signature features and the created ID of the receiver to the server 600. The created ID of the receiver is a unique code representing and associated with the receiver. In the embodiment, the created ID of the receiver is the ID of the receiver.

In step S814, the verification module 620 of the server 600 verifies whether the handwritten signature of the receiver is true, if yes, the process goes to step S815, otherwise, the process ends.

In step S815, the electronic device 800 opens and displays the electronic file to-be-signed.

In step S816, the electronic device 800 generates signals in response to user's handwritten input for signature and comments on the electronic file.

In step S817, the format conversion module 846 of the electronic device 800 converts the signed electronic file 801 including the content of the to-be-signed electronic file, the signature 802 of the receiver, the signed date 803 and the comments added by the receiver to an electronic file having a HTML format.

In step S818, the encryption and decryption module 848 encrypts the converted electronic file having the HTML format using the feature file of the receiver extracted by the feature extraction module 845.

In step S819, the ID creating module 847 creates an ID of the receiver according to the signature features of the receiver, and adds the created ID of the receiver on the upper right corner of the encrypted electronic file having the HTML format.

In step S820, the control module 842 controls the communication unit 850 to transmit the encrypted electronic file having the HTML format and added the created ID of the receiver to the electronic apparatus 900.

Figure 31:
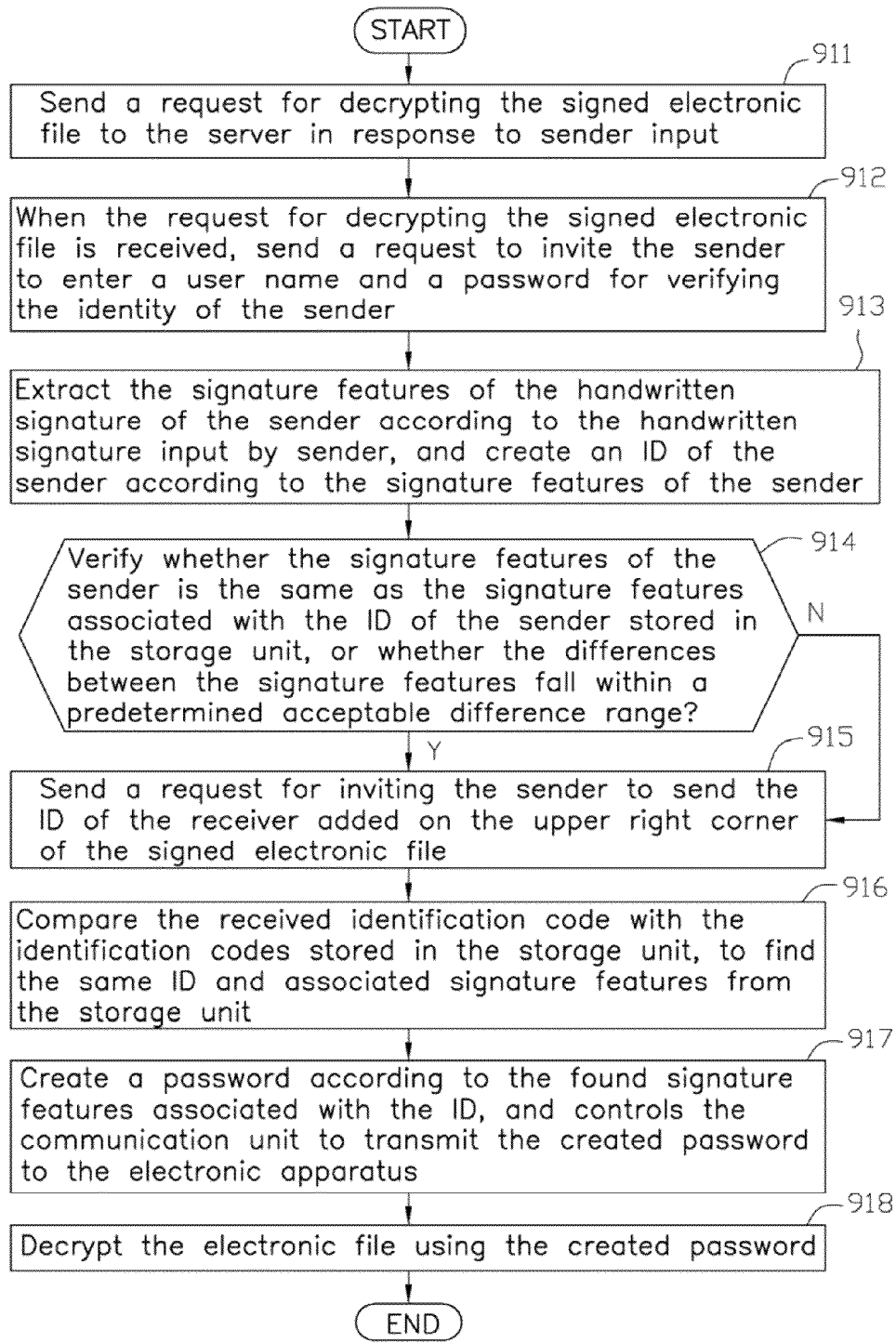
FIG. 31 is a flowchart of a method for decrypting signatures for signature verification systems, such as the one of FIG. 28, in accordance with the exemplary embodiment.

FIG. 31 shows a flowchart of a signed file decryption method of a safety certification method for signatures of the office system 2000. The office system 2000 includes at least one electronic device 800, an electronic apparatus 900, and a server 600. The server 600 includes a storage unit 610, a verification unit 620, a communication unit 630, and a processor 640. The storage unit 610 stores a mapping relationship between a number of signature features of handwritten signatures and a number of user names/IDs. The method includes the following steps, each of which is related to the various components contained in the office system 2000:

In step S911, the electronic apparatus 900 sends a request for decrypting the signed electronic file to the server 600 in response to sender input.

In step S912, when the request for decrypting the signed electronic file is received, the processor 640 controls the server 600 to send a request to invite the sender of the electronic apparatus 900 to enter a user name and a password for verifying the identity of the sender.

In step S913, the feature extraction module 845 of the electronic apparatus 900 extracts the signature features of the handwritten signature of the sender according to the handwritten signature input by the sender, and the ID creating module 847 creates an ID of the sender according to the signature features of the sender. In the embodiment, the extracted signature features and the created ID are transmitted to the server 600.

In step S914, the server 600 verifies whether the signature features of the handwritten signature of the sender transmitted from the electronic apparatus 900 is the same as the signature features associated with the ID of the sender stored in the storage unit 610, or whether the differences between the signature features fall within a predetermined acceptable difference range. If yes, the process goes to step S915, otherwise, the process ends. In the embodiment, the server 600 also transmits the verified result to the electronic apparatus 900.

In step S915, the server 600 sends a request for inviting the sender of the electronic apparatus 900 to send the ID of the receiver added on the upper right corner of the signed electronic file. In an embodiment, this step can be omitted.

In step S916, the server 600 compares the received ID with the IDs stored in the storage unit 610, to find the same ID and associated signature features from the storage unit 610.

In step S917, The processor 640 creates a password according to the found signature features associated with the ID, and controls the communication unit 630 to transmit the created password to the electronic apparatus 900. In the embodiment, the created password is used for decrypting the signed electronic file and only can be used for one time.

In step S918, the electronic apparatus 900 decrypts the electronic file using the created password.

8. Identifying Handwritten Arithmetic Equations and Calculating the Results

An exemplary embodiment of this disclosure provides an electronic device which can automatically identify handwritten arithmetic equations and numerals input by a user and can automatically calculate and output the results accordingly.

Figure 32:
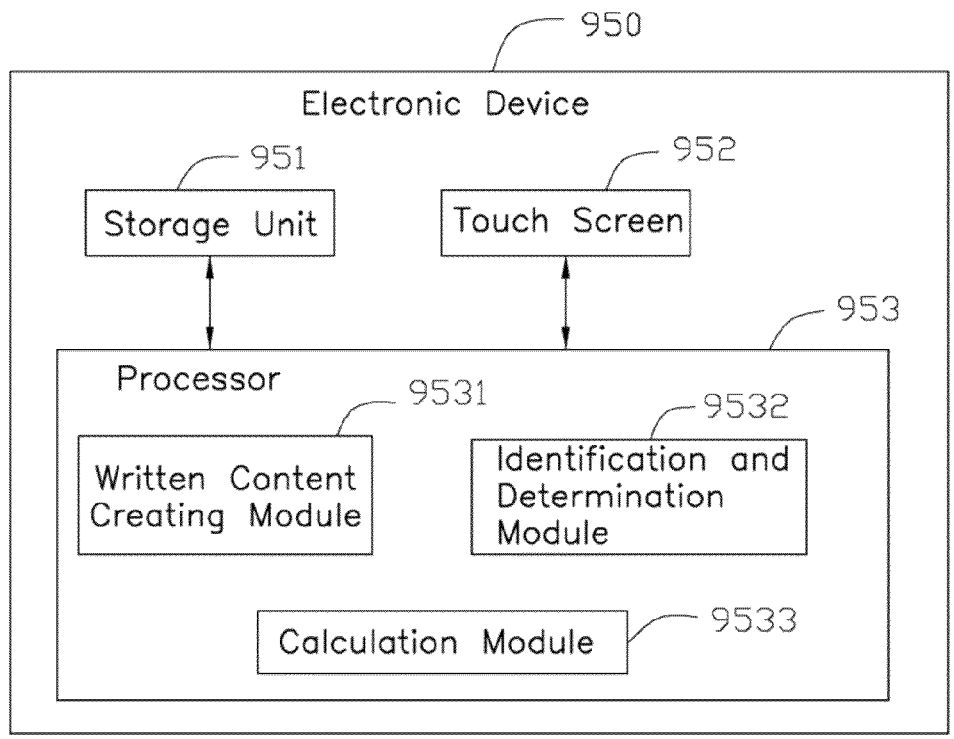
FIG. 32 is a block diagram of an electronic device in accordance with an exemplary embodiment.
Figure 33:
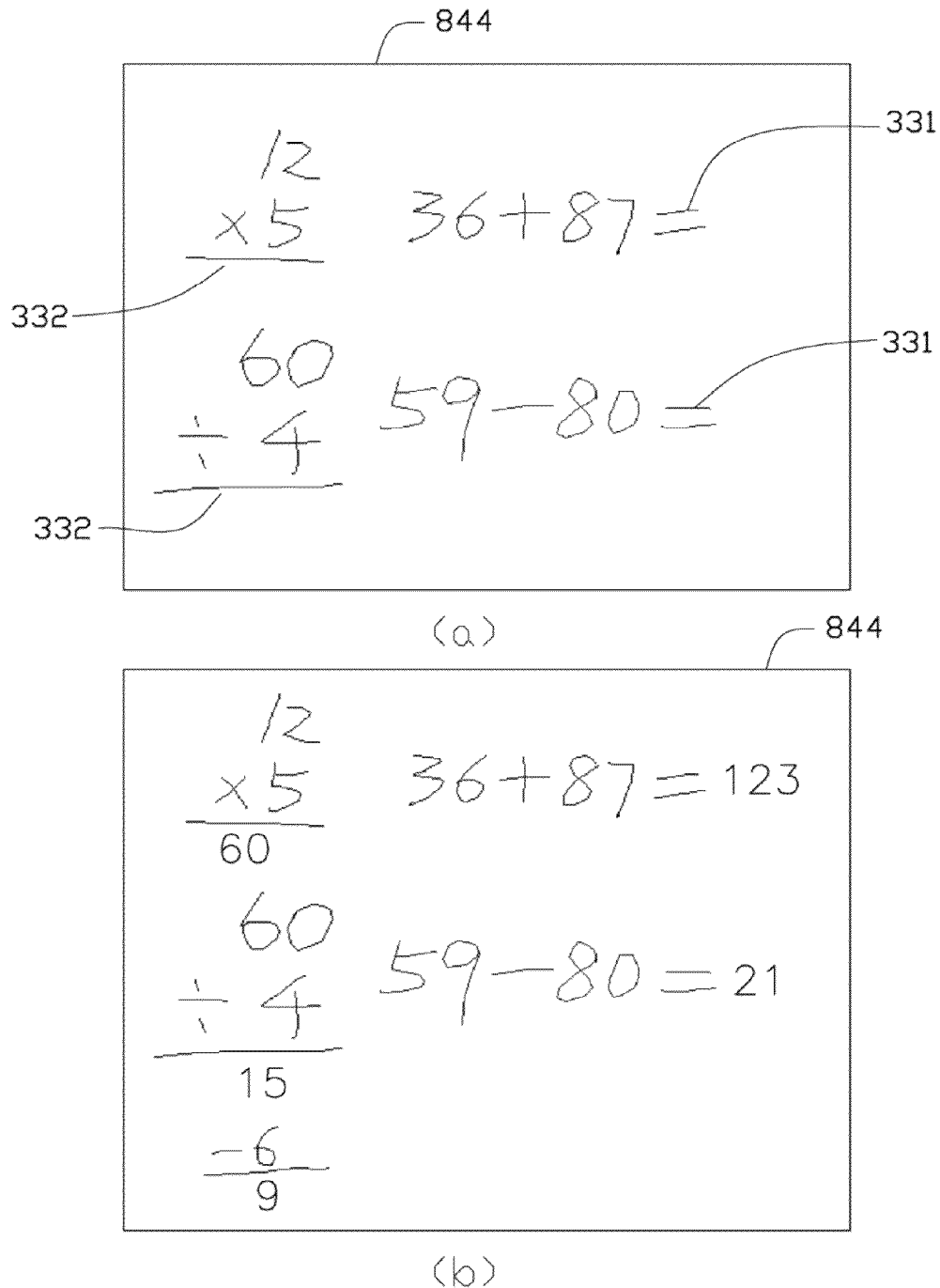
FIG. 33 is a schematic diagram showing the operation interface displayed on the electronic device of FIG. 32.

FIG. 32 is a block diagram of an electronic device 950 in accordance with an exemplary embodiment. FIG. 33 is a schematic diagram showing the operation interface displayed on the electronic device 950 of FIG. 32. The electronic device 950 includes a storage unit 951 storing a number of arithmetic equation models so that handwritten equations can be recognized. For simplicity only basic arithmetic equation models are described. The arithmetic equation model is selected from the group consisting of: the addition equation model, the subtraction equation model, the multiplication equation model, and the division equation model. The arithmetic equation model can be vertical or horizontal (eg. "A+B=").

Each arithmetic equation model defines the following elements: a first numerical position, a second numerical position, an arithmetic symbol, an arithmetic command symbol, and a mapping positional relationship between the first numerical position, the second numerical position, the arithmetic symbol, and the arithmetic command symbol. The arithmetic symbol can be the plus sign, the minus sign, the multiplication sign, or the division sign. That is "+," "−," "×, or *" and "÷" written by the user. If the arithmetic equation model is horizontal, the arithmetic symbol is positioned between the first numerical position and the second numerical position. The second numerical position is positioned between the arithmetic symbol and the arithmetic command symbol. The arithmetic command symbol is—an equal sign "=" followed by a space (eg. the equation 331 shown in FIG. 33) and is close to the second numerical position. If the arithmetic equation model is vertical, the first numerical position is positioned above the second numerical position, the arithmetic symbol is almost flush with the second numerical position, and the arithmetic command symbol is positioned below the second numerical position and the arithmetic symbol. The arithmetic command symbol is a horizontal line (eg. the horizontal line 332 shown in FIG. 33) close to the second numerical position and the arithmetic symbol.

Referring to FIG. 32, the electronic device 950 further includes a touch screen 952 and a processor 953. The touch screen 952 senses handwritten touch input of a user and generates signals associated with the user's handwritten touch input. The processor 953 includes a written content creating module 9531, identification and determination module 9532, and a calculation module 9533. The written content creating module 9531 is configured for creating written content according to the handwritten input signals generated by the touch screen 952, and controlling the touch screen 952 to display the created written content of the user. In another embodiment, the written content creating module 9531 can be a written content display module configured for controlling displaying handwritten content according to the generated signals.

The identification and determination module 9532 is configured for recognizing the handwritten content of the user, and converting the recognized handwritten content into an arithmetic operation if the recognized handwritten content matches one of the arithmetic equation models stored in the storage unit 851. In the embodiment, the identification and determination module 9532 determines whether the handwritten content includes the following elements defined by the arithmetic equation models stored in the storage unit 851: the first numerical position, the second numerical position, the arithmetic symbol, the arithmetic command symbol, and the mapping positional relationship between the first numerical position, the second numerical position, the arithmetic symbol, and the arithmetic command symbol. If the handwritten content matches one of the arithmetic equation models stored in the storage unit 851, the identification and determination module 9532 also transmits the arithmetic equation model matching the handwritten content and the identified handwritten content corresponding to the defined elements of the arithmetic equation model to the calculation module 9533. In the embodiment, the identification and determination module 9532 identifies the handwritten content positioned corresponding to each defined elements of the determined arithmetic equation model according to the coordinates of the handwritten content input by the user.

The calculation module 9533 runs math applications to calculate the result according to the arithmetic equation model matching the handwritten content and the handwritten content corresponding to each element defined by the determined arithmetic equation model transmitted from the identification and determination module 9532. The calculation module 9533 also controls the touch screen 952 to display the calculated result on a predetermined portion. The predetermined position is associated with the type of the determined arithmetic equation model. For example, if the determined arithmetic equation model is vertical, the predetermined position is under the arithmetic command symbol (eg. the horizontal line 332). If the determined arithmetic equation model is horizontal, the predetermined position is on the right of the arithmetic command symbol (eg. the equation 331). In the embodiment, the calculation module 9533 controls the touch screen 952 to display the calculated result immediately after the user writes the arithmetic equation.

Referring to FIG. 33(a), if the user writes a vertical arithmetic equation such as $$\begin{array}{r} 12 \\ \times\phantom{0}5 \\ \hline \end{array}$$

on the touch screen 952, the identification and determination module 9532 identifies that the written numeral corresponding to the first numeral position is the number 12, the written numeral corresponding to the second numeral position is the number 5, the written arithmetic symbol is the multiplication, and the written arithmetic command symbol is the horizontal line 332, according to the signals generated by the touch screen 952 and the handwritten content of the user created by the handwritten content creating module 9531. The identification and determination module 9532 determines the handwritten content of the user matches a vertical arithmetic equation model stored in the storage unit 951. When the horizontal line 332 has been written, the calculation module 9533 then runs math applications to calculate a product and controls the touch screen 952 to display the product-"60" under the horizontal line 332 (see FIG. 33(b)).

FIG. 33 shows other arithmetic equations written by the user. The calculation process is similar to the above described. In an alternative embodiment, the electronic device 950 can identify and calculate written arithmetic equations which are more complicated. These complex arithmetic equations may include more than two numeral positions, eg. "12×(35+48)=." The electronic device 950 can automatically identify the symbols such as the brackets and the braces, and analyze the calculation order between the numeral positions. The calculation module 9533 runs math applications to calculate the result. The electronic device 950 also displays the calculated result for the user.

If the written arithmetic equation is vertical and the electronic device 950 has already calculated and displayed the calculated result for the user, and then the user continues to write an arithmetic equation added below the calculated result (see FIG. 33(b)), then the calculated result (eg. 15) is considered as a number associated with the first numeral position by the electronic device 950, and the newly added number (eg. 6) is identified as the number associated with the second numeral position. Then the electronic device 950 calculates the result (eg. 9) and displays the calculated result for the user.

Figure 34:
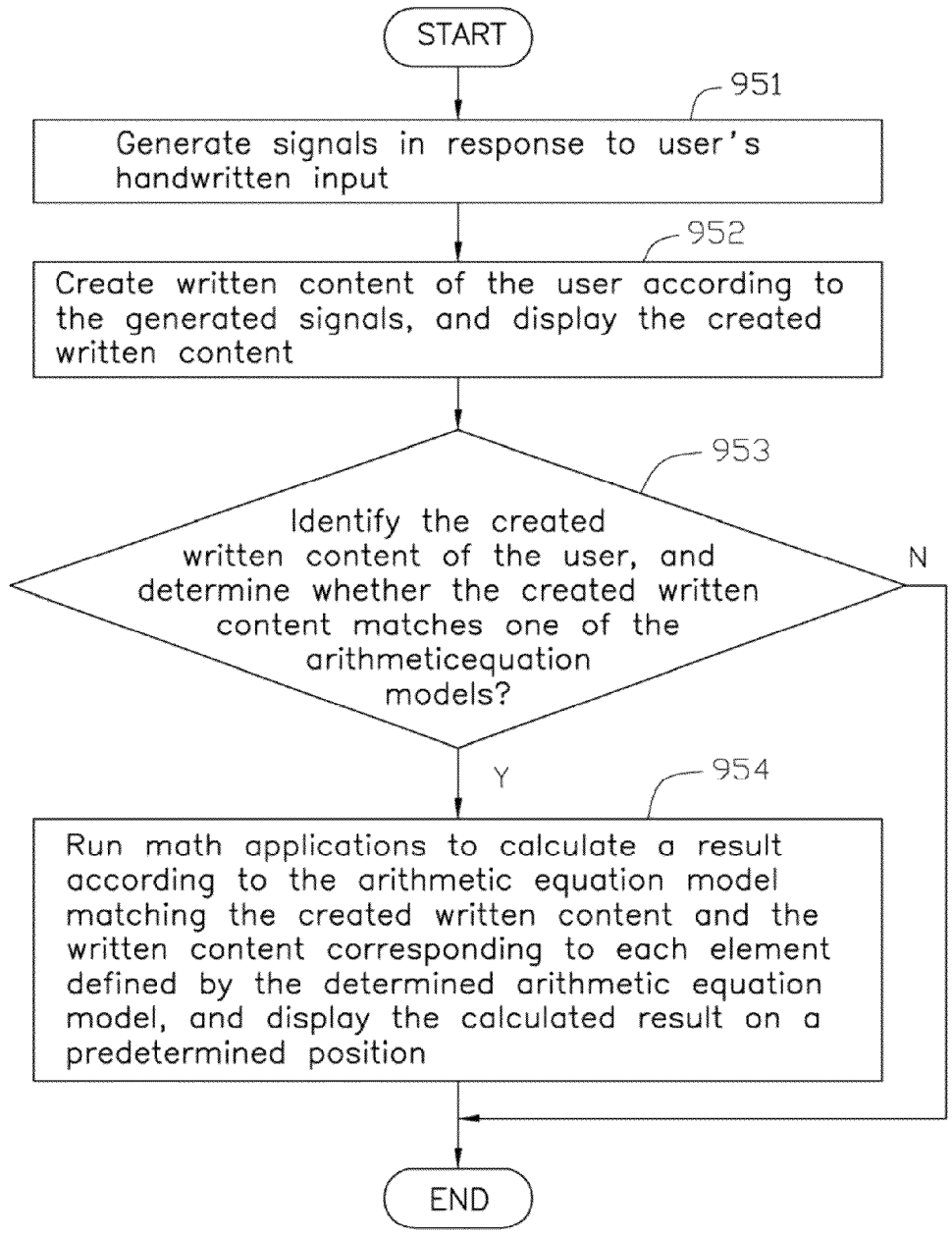
FIG. 34 is a flowchart of a smart calculation control method for electronic devices, such as the one of FIG. 32, in accordance with the exemplary embodiment.

FIG. 34 shows a flowchart of a calculation method of the electronic device 950 of FIG. 32. The electronic device includes the storage unit 951 storing a number of arithmetic equation models. Each arithmetic equation model defines the following elements: a first numerical position, a second numerical position, an arithmetic symbol, an arithmetic command symbol, and a mapping positional relationship between the first numerical position, the second numerical position, the arithmetic symbol, and the arithmetic command symbol. The method includes the following steps, each of which is related to the various components contained in the electronic device 950:

In step S951, generating signals in response to user's handwritten input.

In step S952, creating written content of the user according to the generated signals, and displaying the created written content. In the embodiment, the written content is handwritten content.

In step S953, identifying the created written content of the user, and determining whether the created written content matches one of the arithmetic equation models stored in the storage unit 851. If yes, the process goes to step S954, otherwise, the process ends.

In step S954, the calculation module 9533 runs math applications to calculate a result according to the arithmetic equation model matching the created written content and the written content corresponding to each element defined by the determined arithmetic equation model, and displaying the calculated result on a predetermined position.

With such a configuration, the electronic device 950 can automatically identify the handwritten arithmetic equations and numerals input by the user and can automatically calculate the results accordingly. The electronic device 950 also displays the calculated result on a predetermined position which is satisfied with the conventional habits of the user. Thus, it matches the written operation of the user on real papers, which is more convenient and accustomed for the user.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
   a storage unit, configured for storing a plurality of images;
   a touch input unit, configured for generating a trigger signals if a touch trace of a user forming a closed loop having an enclosed region, sensing handwritten touch input by the user within the enclosed region or across the loop and generating signals associated with the handwritten touch input; and
   a processor, comprising:
      a command identification module, configured for determining whether the sensed handwritten touch input is associated with an image inserting command in response to the trigger signal;
      an image retrieving module, configured for retrieving an image selected by the user from the storage unit, if the sensed handwritten touch input is associated with an image inserting command; and
      a control module, configured for controlling displaying the selected image within the an enclosed region of the closed loop.

2. The electronic device as described in claim 1, wherein if the sensed handwritten touch input is a slide across the loop from an outside to an inside thereof, the command identification module determines the sensed handwritten touch input is the image inserting command.

3. The electronic device as described in claim 1, wherein the closed loop is a box.

4. The electronic device as described in claim 1, wherein if the sensed handwritten touch input is a predetermined handwritten command for inserting images within the enclosed region, the command identification module determines the sensed handwritten touch input is the image inserting command.

5. The electronic device as described in claim 4, wherein the predetermined handwritten command for inserting images is a word selected from the group consisting of: image, photo, picture, or any other word having a meaning of "image" or a letter representative of image.

6. The electronic device as described in claim 4, wherein the closed loop is a box.

7. The electronic device as described in claim 4, wherein the processor further comprises an adjustment module configured for adjusting the size of the selected image to conform to size of the closed loop, if the size of the selected image is not the same as the size of the closed loop.

8. The electronic device as described in claim 7, wherein the adjustment module is also configured for adjusting the contour of the selected image to conforming to the closed loop.

9. The electronic device as described in claim 1, wherein the plurality of images is selected from the group consisting of: pictures and photos.

10. The electronic device as described in claim 1, being selected from the group consisting of: a laptop, a mobile phone, a digital photo frame, a tablet computer, and an electronic reader.

11. A method for inserting images, comprising:
sensing a touch trace of a user forming a closed loop having an enclosed region and generating a trigger signal if the touch trace forms a closed loop having an enclosed region;
sensing handwritten touch input by the user within the enclosed region or across the loop and generating signals associated with the user's handwritten touch input;
displaying the closed loop and the sensed handwritten touch input of the user;
determining whether the sensed handwritten touch input is associated with an image inserting command in response to the trigger signal;
retrieving an image selected by the user from a storage unit, if the sensed handwritten touch input is associated with an image inserting command; and
displaying the selected image within the an enclosed region of the closed loop.

12. The method as described in claim 11, further comprising:
identifying whether the sensed handwritten touch input of the user is a slide across the loop from an outside to an inside thereof; and
determining the sensed handwritten touch input of the user is the image inserting command if the sensed handwritten touch input is the slide across the loop from the outside to the inside of the closed loop.

13. The method as described in claim 12, wherein the closed loop is a box.

14. The method as described in claim 11, further comprising:
identifying whether the sensed handwritten touch input is a predetermined written command for inserting images within the enclosed region; and
determining the sensed handwritten touch input of the user is the image inserting command if the sensed handwritten touch input is the predetermined handwritten command for inserting images within the enclosed region.

15. The method as described in claim 14, wherein the predetermined written command for inserting images is selected from the group consisting of: image, photo, picture, or other terms, letters or phrases having a meaning or representative of "image" or "inserting an image or images".

16. The method as described in claim 14, wherein the closed loop is a box.

17. The method as described in claim 14, further comprising:
adjusting the size of the selected image to conform to the closed loop, if the size of the selected image is not the same as the size of the closed loop.

18. The method as described in claim 14, further comprising:
adjusting the contour of the selected image to conform to the closed loop.

19. The method as described in claim 11, wherein the plurality of images is selected from the group consisting of: pictures and photos.

* * * * *